Nov. 1, 1938.　　　M. STALEY ET AL　　　2,135,204
CONTROL SYSTEM
Filed June 8, 1934　　　7 Sheets-Sheet 1

Fig. 2ª

Nov. 1, 1938.  M. STALEY ET AL  2,135,204
CONTROL SYSTEM
Filed June 8, 1934  7 Sheets-Sheet 6

Nov. 1, 1938.  M. STALEY ET AL  2,135,204
CONTROL SYSTEM
Filed June 8, 1934     7 Sheets-Sheet 7

Patented Nov. 1, 1938

2,135,204

UNITED STATES PATENT OFFICE 2,135,204

CONTROL SYSTEM

Marcellus Staley and Adolf Kramer, Brooklyn, N. Y., assignors to Staley Elevator Company, Inc., New York, N. Y., a corporation of New York Application June 8, 1934, Serial No. 729,689

58 Claims. (Cl. 187—29)

This invention relates to a control system and is more particularly, although not exclusively directed to a control system for automatic electric elevators.

One of the principal objects of the invention is to provide a simplified and compact controller unit, which is efficient, dependable and economical in operation; the unit comprising comparatively few parts and being of small size, light weight and low cost of manufacture.

Another object of the invention is to arrange the elements of the controller in a manner permitting ready access to the parts, whereby the unit can be easily assembled or dismantled, and the adjustment of parts, or their removal for repair or replacement, is facilitated.

Another object is to provide an improved arrangement of a rotatable control drum for governing various operations of the control system.

Another purpose of the invention is to provide means adapted to function intermittently to effect full, accurate and rapid movements of the control drum.

Another object is the provision of means for controlling the stopping of an elevator car on a call registered oppositely to responding direction, and separate means, adapted to act in substantially the same time period, to control stops on calls registered in responding direction.

It is also the purpose of the invention to obviate the use of mechanical connections between the elevator car and its controller.

And, it is a further object to provide a control system for electric elevators which is full-collective, full-cumulative, full-selective and single push, i. e. responsive to the momentary pressure of push buttons.

Other objects and advantages will more fully appear as the description proceeds.

In the drawings accompanying and forming part of this specification:

Figures 2, 2a, represent diagrammatically the relationship of the various elements and electrical circuits of the system.

The control system of the present invention is available to a broad range of applications. In the present form, merely for illustrative purposes, it is shown as applied to the control of the operations of an automatic electric elevator. It can be operated through the medium of direct current, alternating current, or a combination thereof. The call or signal branch of the system can be either a single-button type, or, as preferred, can be a two-button, single-push arrangement. Various other features, depending upon individual requirements can be added to and made part of the system, such as the lighting of indicator arrows, the indication of registered signals, the manner of response thereto, and like features.

In the form of the invention illustrated, a two-button, single-push call system is provided. It is shown applied to a seven stop installation. The landing floors are each provided with a hall box H. At the floors intermediate the first, or main, floor each hall box carries up and down push button actuated contacts, designated U2, D2; U3, D3; U4, D4; U5, D5. The hall box at the first, or main, floor is provided with a single set of push button contacts, U and D1, and the hall boxes at the basement and upper terminal each carry a set of push button contacts, DB and U6, respectively. In the form shown, the car is provided with a gang-switch box GS in which is mounted a set of floor-corresponding push buttons for operating associated contacts as will be described.

Figure 1:
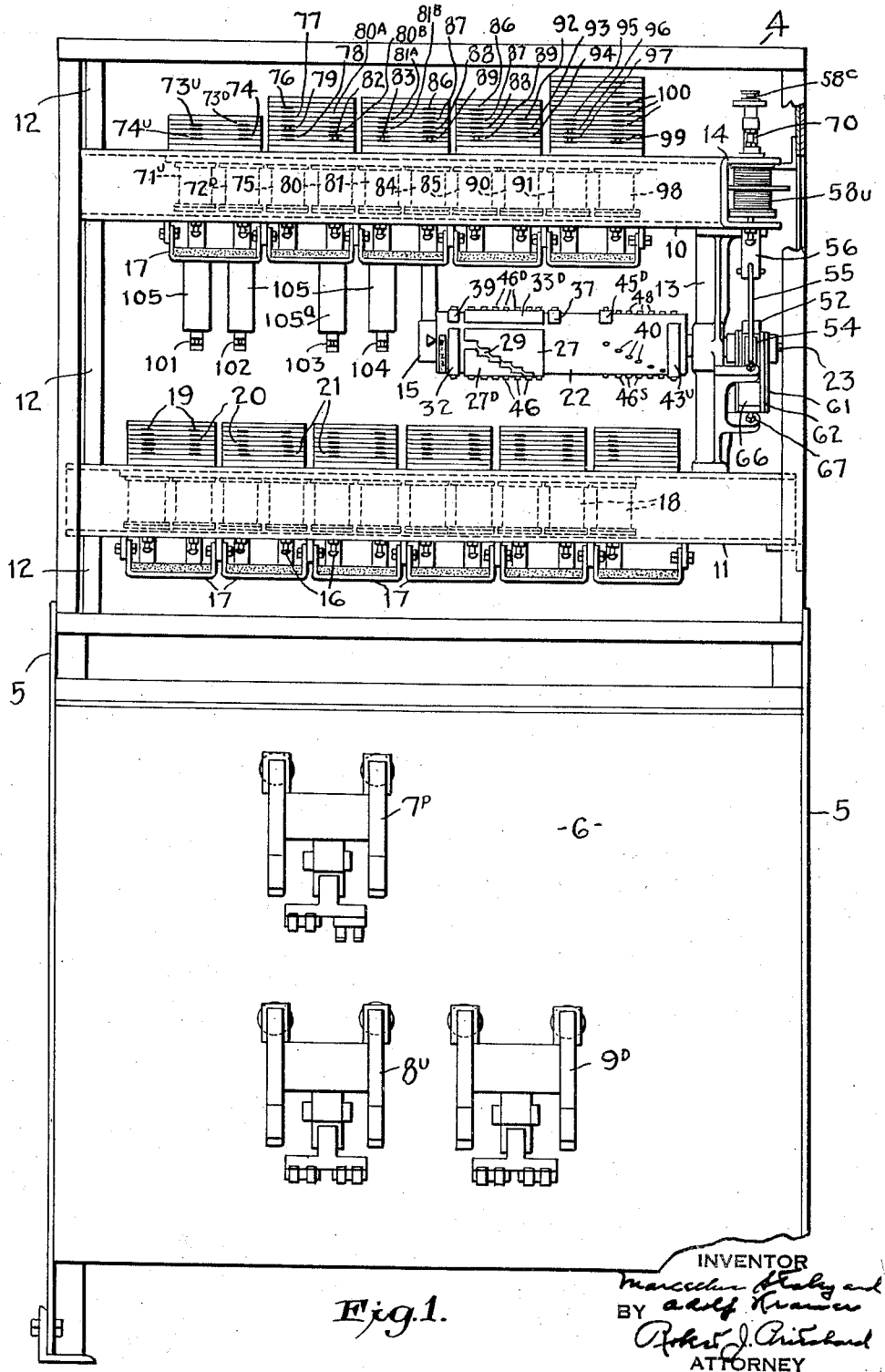
Figure 1 is a view in elevation of the controller.

The mounting structure for the controller of the system, see Figure 1, comprises a case 4 mounted on a bridge frame, between two forward legs 5, of which, is a panel 6. For the purpose of the present description the panel is shown carrying a potential switch 7P, an up direction switch 8U and a down direction switch 9D.

In case 4 channel members 10 and 11 are arranged. Spacer sleeves 12, fitted on a bolt extending within the case, serve to position and support the channel members at one side of the case. At the opposite side of the case, channel member 11 rests on an angle piece secured to the case and channel member 10 is supported on an extended toe of a bracket 13, which, in turn, is supported on the channel member 11. Arranged in abutting relation with one end of channel 10, is a channel section 14, the mouth of which faces a cutout provided in the adjacent side wall of the case. The lower limb of section 14 rests on the extended toe of the bracket 13 and its upper limb rests on an angle piece secured to the case. The bracket 13 is also suitably bored and serves with a bearing arm secured in the case, to provide bearings for the shaft of a control drum of the system.

Mounted in each of channel members 10, 11 and 14 is a plurality of electro-magnetic devices and means are provided, see Figure 1, whereby the devices are individually removable from the channel members. For this purpose, see Figure 2, screws 16 are threaded through the lower limbs of the channel members and take into a bottom plate provided for each magnet. The screws are provided with locknuts and serve to securely hold the magnets in place in the channels. Depending from channels 10 and 11 are stirrups 17, see Figure 1, each of which, by means of bolts passing through the stirrup straps, is secured to lugs depending from the channel members. Each stirrup, in the form shown, spans two or more magnets and is faced with a pad of felt or the like upon which the magnet plungers are adapted to rest. When it is desired to remove a magnet, the stirrup bolts are loosened and the stirrup is swung, enabling the magnet plunger to be removed; whereupon screws 16 are withdrawn, the bottom plate of the magnet is extracted, freeing the magnet, so that it can be removed from its channel member. Each of the electro-magnetic devices of the system is also adapted to control the actuation of contacts, which are carried by the channel members, and the limbs of the channels are provided with spaced, registering openings to permit reciprocal movements of the magnet plungers.

Heretofore the magnet housings were generally formed of castings. These were bulky, heavy and expensive. The improved structure dispenses with the use of castings. The provision of channel members, each of which carries a plurality of the electro-magnetic devices of the system, and their associated contacts, effects a considerable reduction in weight and a substantial saving in the manufacturing cost of the controller. The air flow through the channel members results in rapid dissipation of the heat generated in the magnets, improving the efficiency of the system. Each of the channel members also serves as a magnetic frame for a plurality of the electro-magnetic devices of the system. The controller is also characterized by the features that all of the electro-magnetic devices are of the same structural arrangement and that all of the contacts controlled by the magnets are of the same type. The arrangement permits ready access to the various parts and provides for the convenient removal of the individual magnets. If desired the case can be detached and the various sections of the controller can be transported by hand. The unit requires little space and can be installed in any desirable location in a building.

The devices mounted in channel member 11 comprise a battery of floor magnets 18, which form part of the call branch of the system. In the arrangement illustrated, two terminals and five intermediate floors are indicated and, as shown in Figure 2a, the first magnet of the battery 1U and D, reading from the left of the figure, serves as the first, or main, floor up and down call magnet, the following five magnets 2U to 6U, inclusive serve as up call magnets for the second to the sixth floors, and the remaining five magnets indicated as BD and 2D to 5D, inclusive serve as down call magnets for the basement and the second to the fifth floors, respectively. Each magnet 18 is adapted to actuate decks of contacts mounted above and supported by channel member 11. In the form shown, three contact decks 19, 20 and 21 are associated with each floor magnet.

Figure 2:
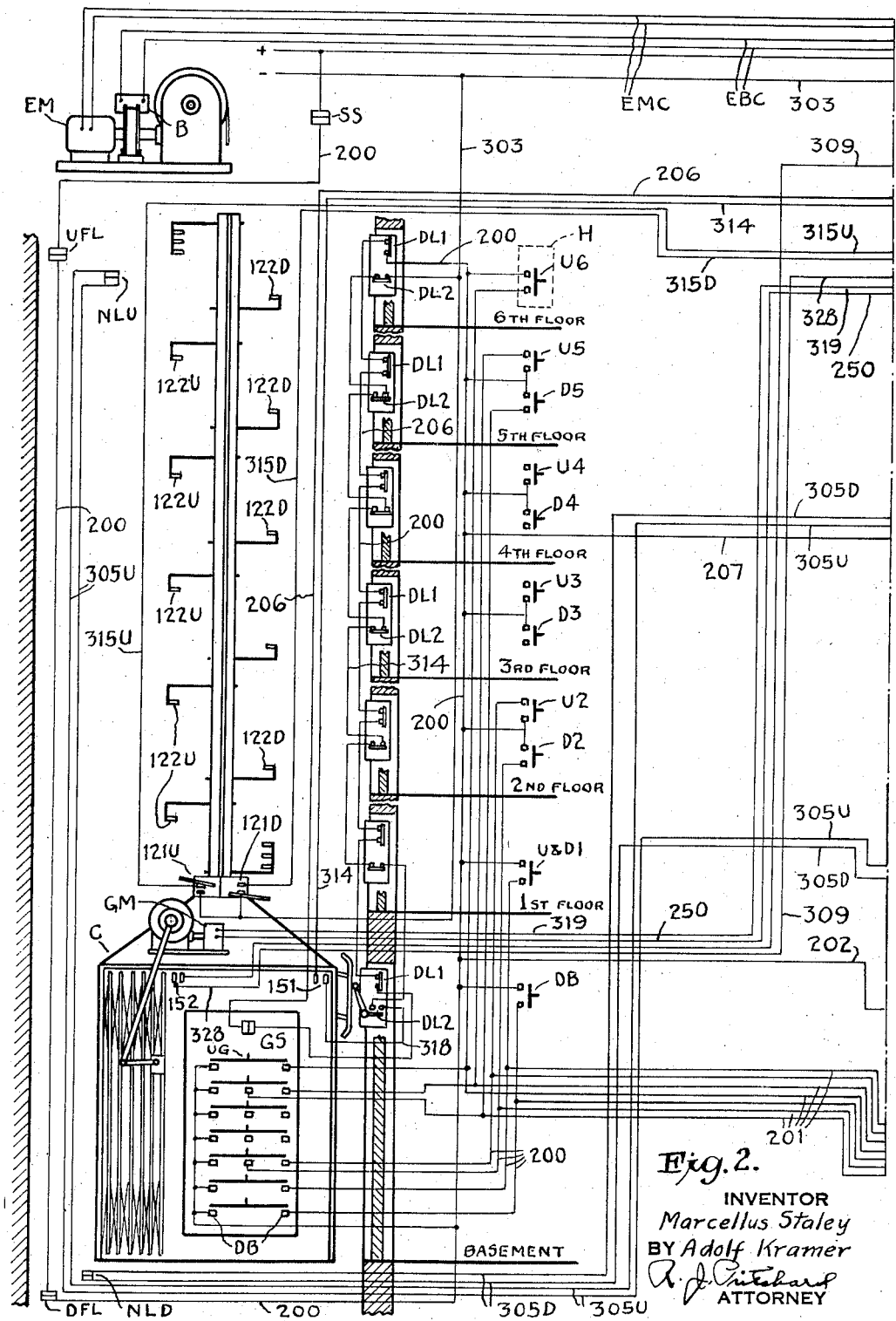

As will be described, each floor magnet is adapted to be connected with a return line to a current source, and the other side of each magnet is adapted, upon actuation of a corresponding push-button contact, to be connected with the other side of the current source. In the gang switch box GS, as shown in Figure 2, an up contact and a down contact corresponding to each of a plurality of floors (in this instance the contacts corresponding to each floor intermediate the first and sixth floors), is bridged by a contact bar. With this arrangement, pressure of a button corresponding to any of said floors will act to complete a circuit for jointly energizing the up call and the down call magnet corresponding to such floor. Also, in accordance with the arrangement shown, pressure of a button at a landing floor or of a corresponding button in the car will close a circuit for energizing a corresponding floor magnet of the same battery. The floor magnets serving for the registration of call signals are thus reduced in number. As will be clear from the above the pressing, at any intermediate floor of the up push button and the down push button, and the pressing of the floor-corresponding button in the car will cause the operation of the two floor-corresponding relays. The system shown, as stated, serves seven stops, is fully collective and fully selective with respect to up and down calls and only requires eleven floor relays.

In the arrangement shown there is employed a commutating machine, comprising a control drum adapted for rotational movements and which can be mounted either on the car or in the controller. In the latter instance the drum is actuated by the energization of jump magnets. These are preferably, although not necessarily, actuated by means of drum relays, which, in turn, receive electrical impulses controlled by movements of the car. The control drum 22, see Figure 1, is pinned to a shaft 23, bearing in the bracket 13 and in the arm 15, as previously described. The drum is preferably composed of Bakelite and is divided into a plurality of control units, comprising, in the form shown (see Figures 2a and 5), a call section C, a dispatch section D and an intercepting or stop section S. Call section C and dispatch section D of the drum are spaced apart and arranged in substantial alinement about the circumference of the drum, each occupying something less than 180° of the drum surface. An adjacent circumferential portion of the drum carries the elements comprising stop section S.

Call section C comprises two metal plates 27U, 27D, each having a stepped edge, the stepped edges of the plates being arranged in adjoining relation and providing a staggered, floor-corresponding gap at 29. Conductors 30, 31 connect plates 27U, 27D, respectively, to a feed strip 32.

The dispatch section D also comprises two metal plates 33U, 33D, arranged as above described to form a staggered floor-corresponding gap at 35. Conductor 36 connects plate 33D with a down direction feed strip 37D, and conductor 38 connects plate 33U with an up direction feed strip 39U.

Section S comprises two rows of contacts 40U, 40D. The rows are spaced 180° apart about the drum and the spots of a row are arranged in offset relation to each other. Conductor 42 connects the spots of row 40U together and to an up feed strip 43U, and conductor 44 connects the spots of row 40D together and to a down direction feed strip 45D.

Figure 6:
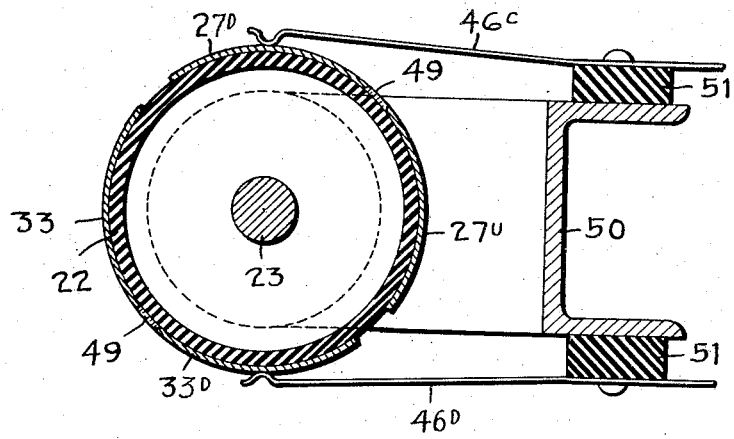
Figure 6 is a cross-sectional view of the control drum and its associated contact fingers.

Sets of stationary, floor-corresponding contact fingers 46C, 46D and 46S are also provided and respectively cooperate with the call, dispatch and stop units C, D, S, respectively. The various conductor connections are preferably arranged within the drum and the gaps 29 and 35 can be provided with glass inserts 49 to guard against the undesirable carbonizing effects of possible arcing. In the preferred form, see Figure 6, a channel section 50 is arranged in case 4 behind the control drum and one end of each of the drum contact fingers is secured to an insulating strip 51 carried by the channel section.

In the arrangement here described, call section C of the drum serves, (1) to prevent registration of a call from a landing corresponding to the position of the car at rest, (2) to collect calls, and (3) to cooperate in the holding of all calls until served. This section can, if desired, be modified to serve alone to hold calls until served, and to cancel calls.

The dispatch section D serves, (1) to determine the direction of car travel to respond to an initial call (2) to control stopping of the car in response to the farthest call entered in the direction opposite to car-corresponding direction (termed a "wrong direction" call) and, (3) to maintain travel of the car to the farthest call registered regardless of the direction indicated by the call.

The function of stop section S is to control stopping of the car in successive response to calls registered in established direction ("right direction" calls).

As will be clear from the above a small and ordinary form of drum provided with a simple arrangement of means, serves to govern many of the essential operations of the system. The drum may be provided with means for performing additional functions, or, without adding to the overall dimensions of the unit, a drum of somewhat greater length can be substituted and provided with means whereby other features, such as the call-responsive arrangements previously referred to, can be incorporated in the system.

It will be observed that the system described need not be restricted to the use of a commutator or selector machine of the drum type. The machine, if desired, can be arranged to be moved in a horizontal, or vertical or inclined plane.

Means are also provided for imparting intermittent step movements to the commutator in opposite directions in accordance with direction of travel of the car, it being the object of the invention to provide for this purpose an arrangement adapted to effect the movements accurately and rapidly.

Figure 3:
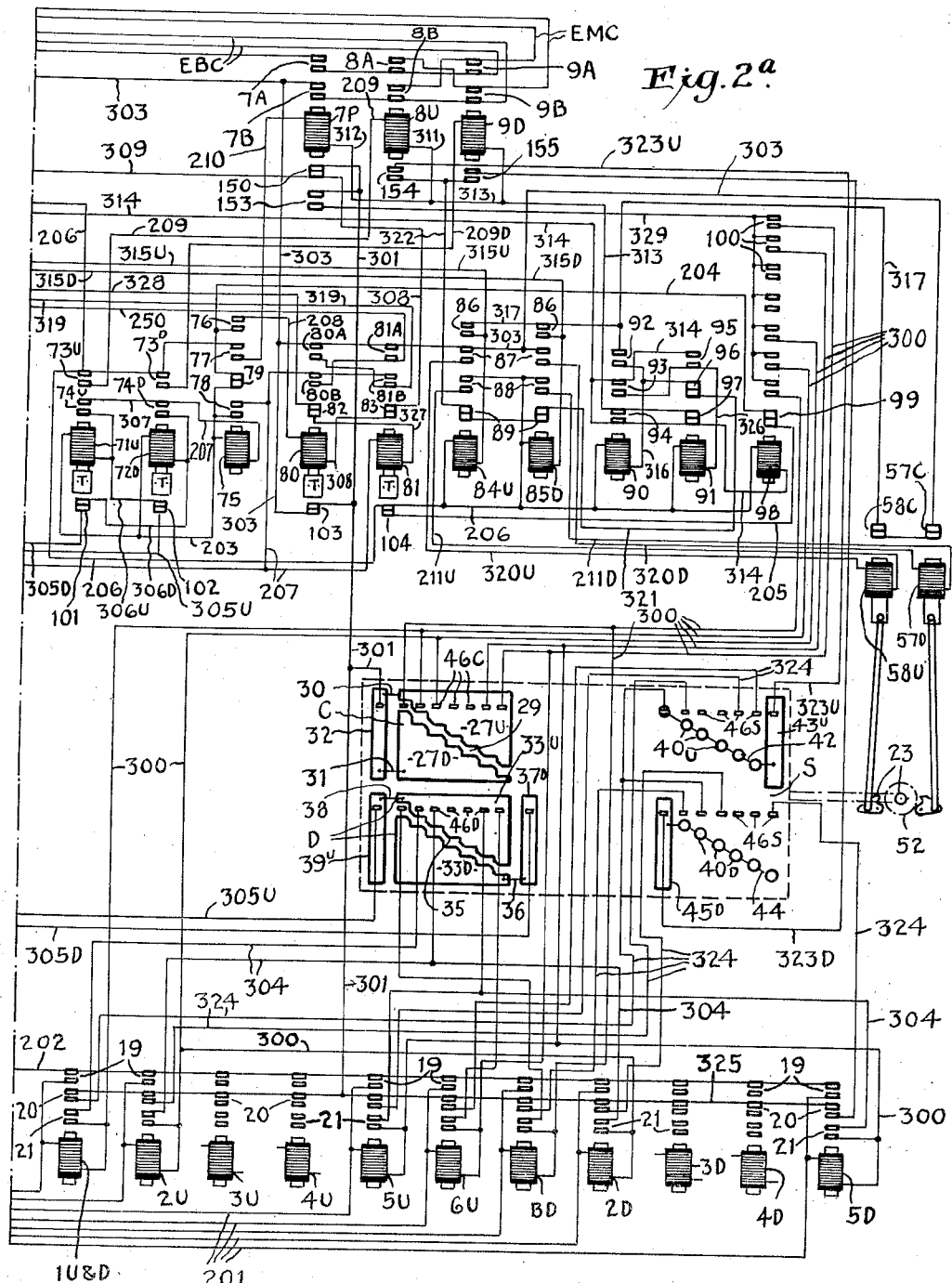
Figure 3 is an end elevation showing the means for driving the control drum, certain parts being broken away and other parts being in section.
Figure 4:
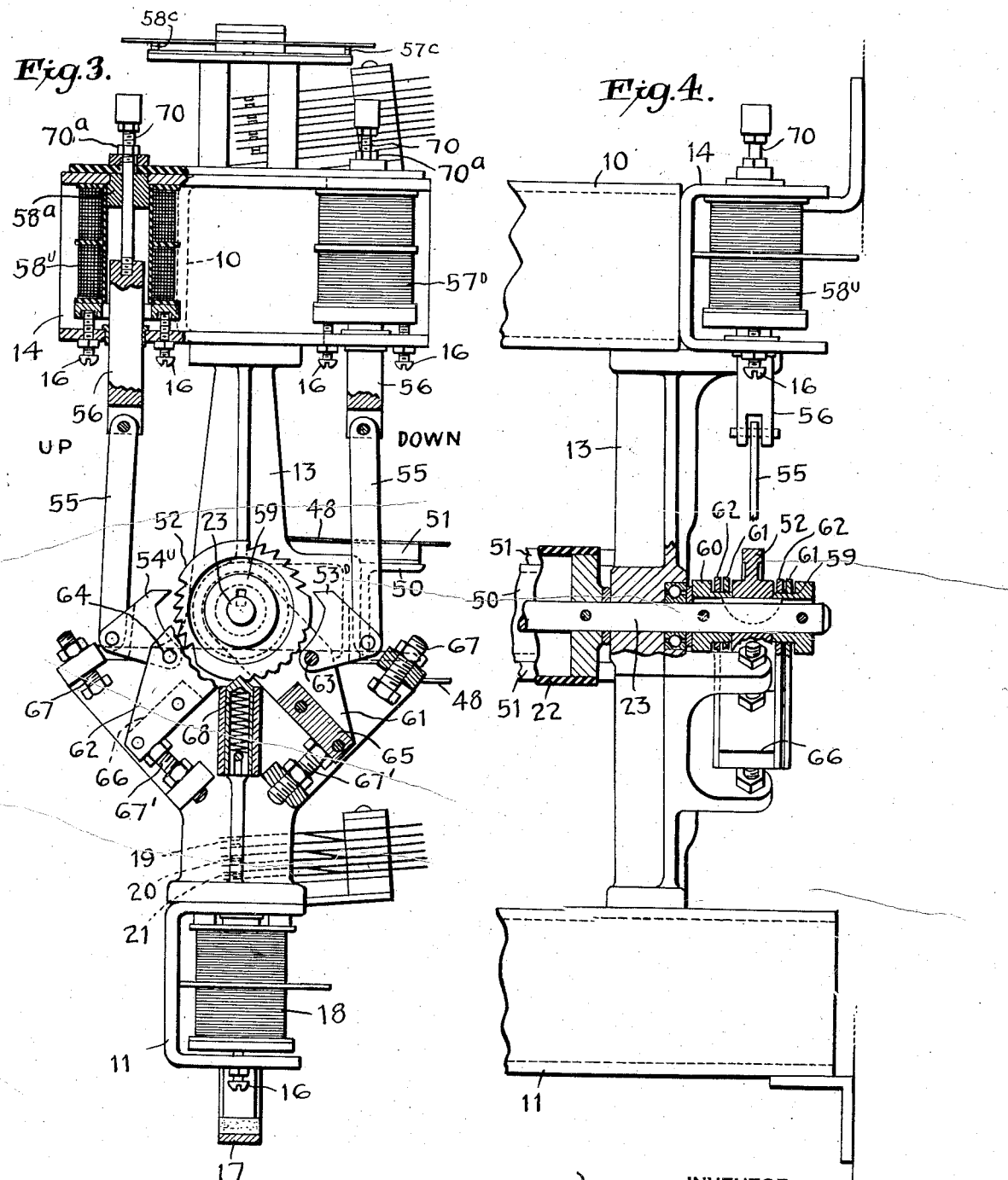
Figure 4 is a front view of the arrangement shown in Figure 3, certain parts being in section.

In the embodiment illustrated, see Figures 3 and 4, keyed to drum shaft 23 is a ratchet gear 52, provided on opposite sides with floor-corresponding teeth which are adapted to be engaged by pawls 53D, 54U, on downward and upward movements, respectively, of the car. Each pawl is pivoted on the lower end of a vertical connecting member 55, each of the latter being pivotally connected to a plunger 56, one of which is provided for each of two jump magnets 57D, 58U, mounted in channel section 14. At opposite sides of ratchet gear 52, flanged collars 59, 60 are pinned to drum shaft 23 and on the collars radial links 61, 62 are loosely fitted. Each radial link comprises two arms rounded and bored at their inner ends, one arm of each link being carried on each of the collar members. Extending between and carried by the arms of links 61, 62 respectively, are pins 63, 64 on which pawls 53D, 54U, respectively, are fulcrumed. Also extending between and carried by the arms of the links are buffer blocks 65, 66, respectively, each of which is adapted to engage an upper and a lower stop 67. Stops 67, in the form shown, comprise adjustable set screws, each threaded through a boss on the bracket 13. A normally spring-pressed detent 68 is also provided, carried by the bracket 13 and adapted to dwell in indents provided in ratchet gear 52.

When a jump magnet is energized, for example magnet 58U, its plunger and connecting rod rise and pawl 54U will first turn about its fulcrum pin 64 of link 62 and engage a tooth of ratchet gear 52. As the plunger and connecting rod continue to ascend pawl 54U will firmly mesh with a tooth of the ratchet gear and act to turn the gear and control drum and to carry radial link 62, outwardly and upwardly. The upward movement of the magnet plunger is limited by a stop plug 58a, at which time buffer plate 66 of link 62 engages an upper stop screw 67. This arrangement securely locks the pawl in the ratchet gear as the drum is driven one full step. Overrun due to momentum is effectively prevented and backlash can not occur while the magnet is energized. When the magnet is de-energized, its plunger will be released and will drop and the pawl will return to its initial starting position and clearance, with respect to the ratchet gear. This is effected by means of the buffer plate 66 striking a lower stop screw 67', and the stop nut 70a arranged on the plunger stem to limit the downward movement of the plunger. As will be clear adjustments can be made to compensate for wear and play in the parts.

The inertia of an actuated plunger, connecting rod and link is adapted, through the associated pawl to provide a temporary lock for the drum at the end of the forward movement of the pawl, avoiding the introduction of errors and securing precise movements of the drum. This is of particular importance when high speed A. C. magnets are used and the drum develops increased momentum.

Arranged above and adapted to be actuated by the stem of the plunger of each jump magnet is a pair of contacts 57C, 58C respectively, the purpose of which will be hereinafter described.

Another bank of electro-magnetic devices is carried in the channel member 10 arranged in the upper portion of case 4. In the order of their showing, reading from the left in Figures 1 and 2, there is provided, up direction and down direction relays 71U, 72D, above each of which are two pairs of contacts 73U, 74U, 73D, 74D, and below which are normally-closed contacts 101, 102, respectively. The latter provide a criss-cross circuit whereby, when one relay is energized, the normally-closed contacts below it are opened to hold open the energizing circuit for the other relay. Alongside of direction relay 72 is a potential relay 75, over which is arranged 5 pairs of contacts 76, 77 and 78, and a pair of normally-closed contacts 79. Following the potential relay are gate closing and gate opening magnets 80, 81, respectively. These latter magnets control hereinafter described circuits comprising contacts 80A, 80B and 81A, 81B respectively for closing and opening a car gate. Each gate magnet is also adapted to control a pair of normally-closed contacts 82, 83, respectively, which are arranged above the magnets and forming part of another criss-cross circuit; and to control a pair of normally-closed contacts 103, 104, arranged below magnets 80, 81, respectively. Adjacent the gate magnets are up drum and down drum relays 84U, 85D, respectively, above each of which are contact decks 86, 87, 88 and a pair of normally-closed contacts 89. Following the drum relays are duplicating and delay stop magnets, 90 and 91, respectively, above which are contact pairs 92, 93, 94 and 95, 96, 97, respectively (contact pairs 96, 97, of delay magnet 91 being normally-closed). The last magnet of the battery is a hold-over relay 98 above which is arranged a pair of normally-closed contacts 99 and pairs of contacts 100, one pair of the latter being provided to correspond to each landing floor. As will be understood, contact pairs 100 can be divided into two groups and controlled by two hold-over relays.

The functions of the foregoing elements and their associated contacts will more fully appear hereinafter.

A feature of the invention is the provision of time controls for certain operations to promote the safety and efficiency of the system. Among the time controlled operations is the delayed closing of the direction relay criss-cross circuit, to prevent direction of travel of the car being reversed too quickly; the retarded re-closing of normally-closed contacts 104, controlled by the gate opening magnet 81 to provide a time interval prior to re-closing of the car gate; and the delayed opening of normally-closed contacts 103 controlled by the gate closer magnet 80, which contacts, when opened, are adapted to effect the cancellation of then registered calls and return all elements of the controller to neutral.

Figure 7:
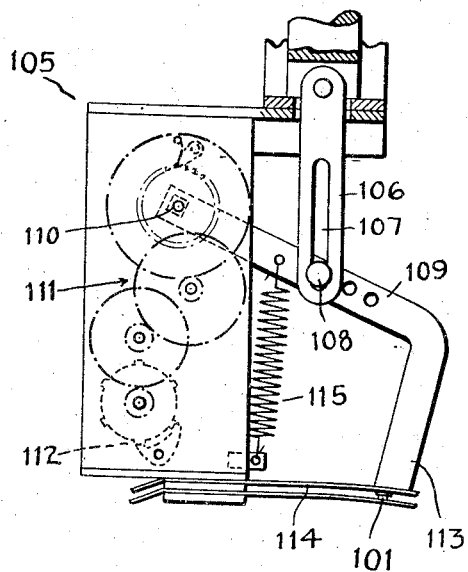
Figures 7 and 8 are fragmentary detail views of forms of "mark-time" elements adapted to be used with the system.
Figure 8:
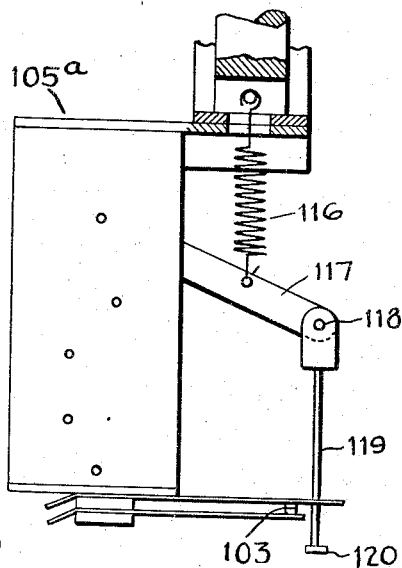

One form of means for performing time-control functions is shown in Figure 7. It comprises a link 106 hung from a magnet plunger, the link having an elongated slot at 107, which receives a pin 108 carried by bent-lever 109. At one end lever 109 is mounted on a shaft 110 of a train of gearing 111 with which is associated the usual ratchet and the escapement 112. Bent arm 113 of lever 109 is adapted to engage a spring strip 114 carrying one contact of a pair of contacts, the contacts being held closed by the action of a spring 115, secured at one end to a case carrying the gearing and, at the other end to the lever 109. Figure 8, illustrates a modified form of time element. In this form, one end of a spring 116 is secured to a magnet plunger and the other end is fastened to a lever 117, to which, at 118, is pivoted a rod 119. At its lower end rod 119 carries a foot or lug 120 which is adapted to engage and flex the upper extended spring strip carrying one contact of a normally closed pair of contacts. If desired, this time element can perform a reverse function. The contacts can be of the normally open type and the lower strip can be extended, whereby the device will act to close the contacts after the lapse of a definite time period.

The time element shown in Figure 7 can be employed to cause the delayed closing of contacts in circuits controlled by the direction relays and the gate opening magnet; and the means shown in Figure 8 can be used to bring about the delayed opening of contacts in a circuit controlled by the gate closer magnet, for the purposes described above.

In accordance with the purpose of the invention to provide a simplified control system comprising few parts and thus reducing the sources of maintenance difficulties, the use of auxiliary magnets for actuating the time means is eliminated, and the mechanism is directly connected to the plungers of the magnets controlling the circuits to be time-controlled. This arrangement in shown in Figure 2a, the geared time-mechanism being indicated at T. A device of the type shown in Figure 7 is directly connected to the plunger of up direction relay 71U, and to the plunger of down direction relay 72D, and to the plunger of gate opener magnet 81, and a time device such as shown in Figure 8 is directly connected to the plunger of the gate closer magnet 80. By this arrangement the plunger of each of the magnets performs its normal functions in the control system and also performs the function of controlling the operation of time-mechanism for controlling other circuits of the system.

It will be observed that the time-mechanism described is entirely mechanical in operation. It can be adjusted to function in different time periods. It is uniform and positive in action, operating without "binding" or "sticking" and its operation will not be impaired by temperature or climatic changes. Thus, the means shown and described is substantially free of objections commonly associated with dash pots.

Another feature of the invention relates to the means for providing accurate and level floor stops. Preferably, the use of mechanical connections are dispensed with and at each landing, in the up and the down direction of car travel, an electrical impulse is transmitted from the car to the controller.

In the form shown, there is arranged on the top of the car an up switch and a down switch 121U and 121D respectively, and on the guide rails for the car, are sets of obstruction fingers 122U and 122D, cooperating with the switches. A finger of up series 122U is arranged a few inches below the upper level of each floor from the first to the upper terminal, inclusive, and a finger of down series 122D is arranged slightly above the upper level of each floor from the fifth to the basement, inclusive. The position of the fingers of the respective series with relation to the level of the floors is selected in accordance with the speed of the car and its slide in making floor stops in the up direction and in the down direction, respectively.

Figure 10:
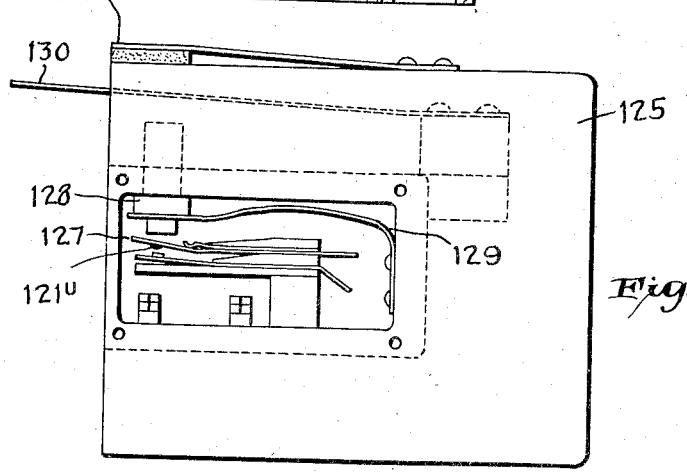
Figure 10 is a detail view of one of the drum-control switches on the car.

Each drum switch carried on the car, see Figure 10, comprises a housing 125 within which switch contacts are mounted on flexible strips 127. The strips are adapted to be flexed, to close the contacts, by means of a button 128, normally urged from the strips by a cantilever spring 129, through which the tip of the button passes. Over button 128 an actuating arm 130 extends, one end of the arm being secured to a boss provided in the switch housing and the other end of the arm projecting exteriorly of the housing, whereby it is adapted to be flexed by the obstruction fingers of one series or the other as the car passes up or down in the hoistway. Mounted on the top of housing 125 and extending over a slot therein, is a spring arm 131, which carries a pad of felt or the like. Arm 130, upon each release from an obstruction finger will strike against the pad on arm 131, this arrangement providing damping means whereby the making of double contacts by the switch mechanism, is avoided.

If desired, additional obstruction fingers can be employed at each terminal. As shown, see Figure 9, two or more fingers of up series 122U can be placed adjacent the upper terminal and two or more fingers of down series 122D can be arranged slightly above the lower terminal floor. In the event the drum should fail to jump on either an up movement or a down movement of the car, then, when the car reaches a terminal in such movement, the proper obstruction fingers and car switch cooperate to effect additional movements of the drum necessary to secure its accurate re-setting. Should the car switch be actuated more than the number of times required for accurate re-setting of the drum, this will have no undesirable effect because the teeth of ratchet gear 52 correspond to the floor stops and the pawl of the energized jump magnet can not engage a tooth of the gear and the drum will not turn.

The arrangement, above-described, involves a number of advantages. It does not require the provision of space equivalent to a miniature hatchway in which a selector machine moves in unison with and in proportion to the movement of the car. It avoids the difficulties involved in securing satisfactory gear ratios to effect the proper proportionate movement of the selector machine. It dispenses with the mechanical connection between the car and the controller, as by means of tapes or the like. Instead, there is provided an arrangement which can be installed in a small space and which is not limited with regard to the heighth of the building with which it is to be used. It does not require a particular location with respect to the car to satisfy the requirements of mechanical connections. It provides a direct 1 to 1 ratio between the car and the controller. It carries out the purpose of the invention to provide a completely electric control system for elevators.

The system in operation is designed to provide proper sequence of response to and serving of passenger requirements.

Figure 5:
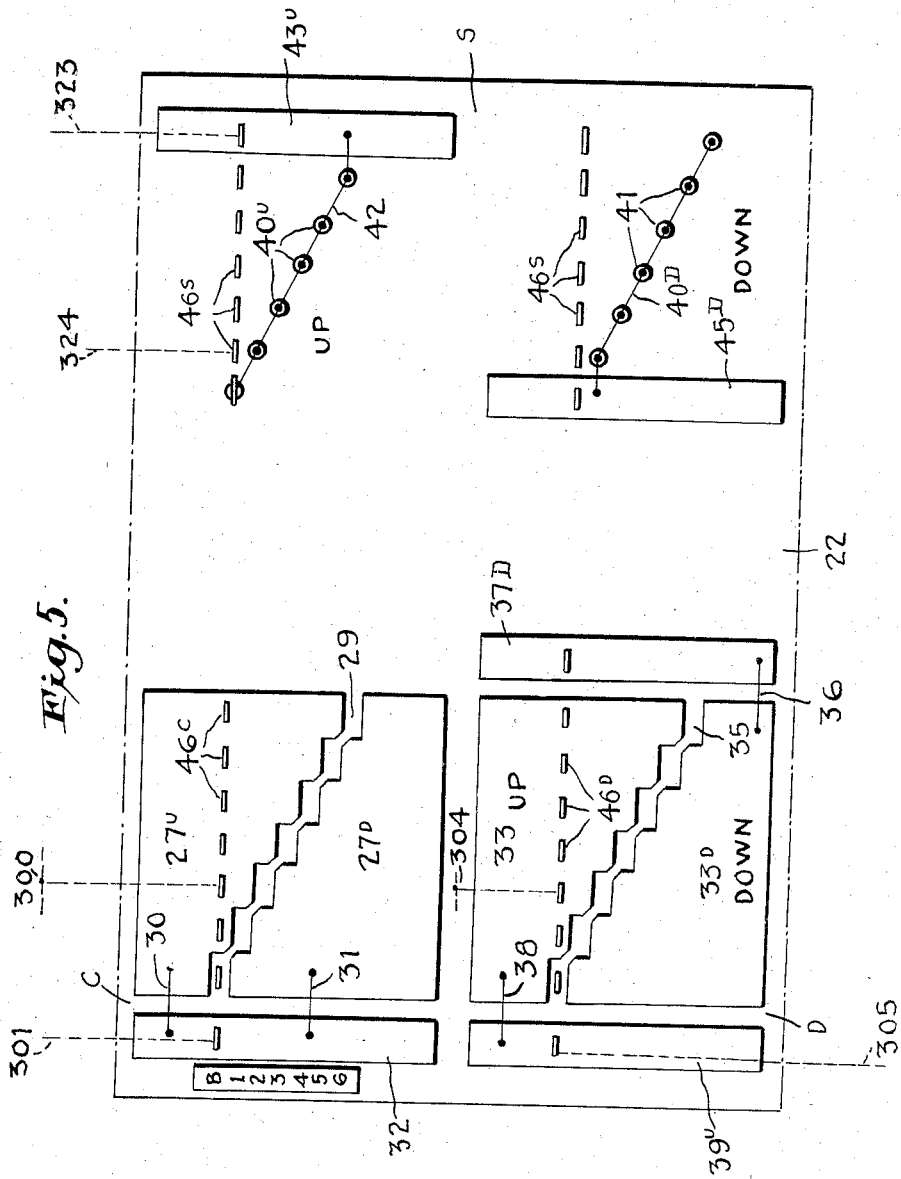
Figure 5 is a plan view showing a development of the control drum, certain wiring connections being indicated by dotted lines.

If, for example, the car is at rest at the basement and no calls are registered, then, see Figure 5, fingers 46C corresponding to all floors, except the basement, rest on plate 27U of call section C of the drum, and the basement corresponding finger 46C rests in the dead spot 29. Thus, calls can be registered for all floors, except the basement. With respect to the dispatch section D of the drum, basement-corresponding finger 46D rests in the dead spot at 35 and the remaining floor-corresponding fingers 46D rest on plate 33U. Plate 33 is connected with up direction feed strip U, which forms part of the energizing circuit for up direction relay 71U as will be described. Accordingly, in response to any calls registered the car will pursue an upward direction of travel.

In the operations now about to be described, particular attention is directed to Figures 2, 2a and 5, the latter showing in dotted lines, the connections which lead to and from the control drum.

If now the fifth floor down button is pressed, there will be registered what is termed a "wrong direction" call, because it is entered for a direction opposite to car-corresponding direction. This button having been pressed, a circuit is established leading from the positive side of the line, see Figure 2, through lead 200, through fifth floor down contacts 25, wiring 201, the coil of the fifth floor magnet 5D of the down series, wiring 300, fifth floor contact finger 46C, plate 27U, conductor 30, feed strip 32, feed finger 46C, of call unit C wiring 301, 303 to the negative side of the line. The plunger of the energized fifth floor magnet in rising will close contact pairs 21, 20 and 19, through the latter of which a self-holding circuit for the floor magnet is completed, leading from positive line 200, wiring 202 and contacts 19 to the coil. Through contacts 21, the negative line through wiring 304 is brought to the dispatch section D of the drum (see Figure 5) through fifth floor contact finger 46D, plate 33U, conductor 38, up direction feed strip 39U, feed strip finger 46D, and wiring 305U, contacts 102 of the direction relay criss-cross circuit, wire 306U, the coil of up direction relay 71U, wiring 203, contacts 79, of potential relay 75, wiring 204, contacts 99 of hold over relay 98, wiring 205, contacts 164 of gate opening relay 81, wiring 206, a series of safety door lock contacts DL1 contacts and wiring 209 to the positive side of the line.

In the form of the invention here shown and described plunger of the energized direction relay 71U closes contacts 74U, 73U, whereupon a potential relay 75 will be energized by means of a circuit leading from the positive line 203, through the coil of relay 75, wire 207, contacts 74U, of up direction relay 71U, to negative line 306U. In the arrangement shown, the plunger of potential relay 75, actuates four pairs of contacts. The opening of normally-closed contacts 79 of the potential relay opens the connection to the positive side of the original safety circuit for the direction relay, this occurring, however, only after the plunger of the magnet has closed the lower contacts 78 to establish through wiring 207 and 200, a direct connection for the direction and potential relays to the positive side of the line. Through contacts 76 above the potential relay the above mentioned original relay circuit is rerouted and a circuit is closed which leads from the positive line 204, through contacts 76, wiring 208, the coil of gate closer magnet 80, wire 308, contacts 83 of the gate opening magnet 81, wire 309, normally-closed potential switch contacts 150, wire 301, to the negative side of the line, whereby the gate closer magnet 80 becomes energized.

As will be clear from the above, positive line 204 is first used in energizing the direction and potential relays, is thereafter disconnected therefrom, and then employed in the energizing circuit for gate closer magnet 80. By this arrangement, it will be observed all hatchway doors must be closed before the gate closer magnet 80 can be energized.

Through the action of the plunger of gate closer magnet 80, contacts 80A, 80B are closed to complete a circuit, whereby a motor GM is started for closing the car gate. This circuit leads from positive line 207 through contacts 80B of gate closer magnet 80 and wiring 250 to the gate motor GM and from the motor through wiring 319 and contacts 80A of gate closer magnet 80 to the negative line 303.

In accordance with the invention, the car gate must first be in substantially closed position before the potential switch and the direction switch can operate. In closing, the car gate is adapted to successively close gate contacts 152, 151. Closing of the contacts 151 completes a circuit for the coils of the up direction switch and the potential switch. In the present instance this circuit leads, from the positive line, through a series of safety door lock contacts DL1, wire 206, contacts 73U above direction relay 71U, contacts 77 above potential relay 75, and wires 209, 210 to the coils of the magnets of the up direction and potential switches 8U and 7P, respectively, through the coils of the switch magnets and thence through wires 311, 312, 313, normally-closed contacts 97 above stop-delay magnet 91, wire 314, gate contacts 151, another series of safety door lock contacts DL2 and wire 303 to the negative side of the line. Potential and up direction switches 7P and 8U will now be actuated to close contacts 7A, 7B and 8A, 8B, respectively, to complete a circuit EBC for releasing elevator motor brake B and a circuit EMC for starting elevator motor EM to start the car in an up direction. The potential switch when so actuated, also opens normally-closed contacts 150, whereby gate closing magnet 80 becomes deenergized, and closes contacts 153. The direction switch 8U when closed acts to close contacts 154.

It is also the purpose of the invention to provide means serving to cooperate in the storing of calls and to effect cancellation of calls. In the preferred arrangement these means are controlled by the car gate, being operated by the closing of the gate and being restored to inoperated position by the opening of the gate. This purpose can be accomplished by causing the car gate to control the operation of one or more hold-over relays, which actuate pairs of floor-corresponding contacts.

Closing of gate contacts 151 completes a circuit starting from positive line 206 through the coil of a holdover relay 98, wiring 314, gate contacts 151, door lock contacts DL2, and wiring 303 to the negative side of the line. The plunger of relay 98 in rising, opens normally-closed contacts 99 the purpose of which will later appear and closes pairs of floor-corresponding contacts 100. There is a pair of contacts 100 associated with each of the single floor relays for the basement, first floor, and upper terminal, and there is also a pair of contacts associated with both the up and the down floor relay for each of the floors from the second to the fifth floors, inclusive. Through closing of the contact 100, the circuit or circuits previously leading from any and all energized floor magnets through the call section C of the drum are transferred and led through wiring 300, to and through now closed contacts 100, wiring 329, closed potential switch contacts 153, wire 301 and contacts 103 to negative line 303, and this circuit connection remains closed until after the car has stopped and its gate has re-opened contacts 151. This provides an arrangement whereby signal circuits are initially established through the call section of the drum and are thereafter by-passed through contacts 100, establishing a zero potential between the drum section and its contact fingers.

The hold-over relay 98 and contacts 100 thus serve to provide parallel call circuits and cooperate with the call unit C of the drum in storing registered calls until they are served. The function of cancelling calls as served is also performed by the contacts 100. When the car stops at a floor, the gate in its opening movement will cause the hold-over relay to be deenergized, as will be described. Relay 98 in opening will cause the separation of the pairs of floor-corresponding contacts 100, opening the circuit for one or both of the corresponding floor relays. By this means, the call or calls for a floor are canceled on the first stop of the car at the floor and the call section of the drum is relieved of the duty of breaking circuits.

Figure 9:
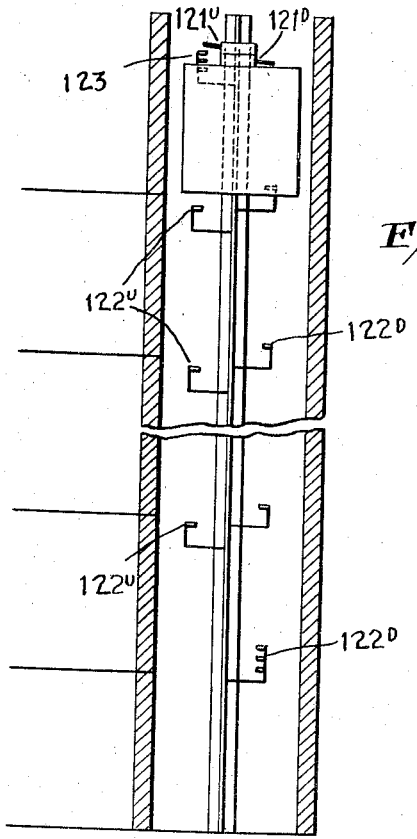
Figure 9 is a diagrammatic view of a means for controlling movements of the control drum.

As the car in responding to the fifth floor call reaches a position approximately opposite to the landing of each intermediate floor, arm 130 of up switch 121U on the car, see Figure 9, will be flexed by an obstruction member of up series 122U, and the switch contacts will be momentarily closed. This arrangement provides means for controlling intermittent, floor-corresponding, step movements of the commutator mechanism. In the form of the invention shown, the engagement of the switch contacts in the hatchway, as described, closes a circuit for energizing up drum relay 84U, the circuit leading from positive line 206 through the coil of relay 84U, wire 315U, the contacts of switch 121U and wiring 318, 303 to the negative side of the line. The plunger of relay 84U will now rise and close several decks of contacts 86, 87, 88 and open normally closed contacts 89. As the original up drum relay energizing circuit through the car switch is only momentarily closed, contacts 86 above the drum relay serve to close a self-holding circuit which leads through wiring 315U, contacts 86 of the drum relay 84U, wiring 317, normally closed contacts 57C, 58C of jump magnets 57D, 58U respectively, and wiring 303 to the negative line. Contact pairs 87, 88 above the up drum relay 84U serve to complete a circuit for energizing the coil of up jump magnet 58U, the circuit running from positive line 206, through contacts 88 of drum relay 84U, wire 211, the coil of jump magnet 58U, wire 320U, contacts 87 of drum relay 84U to negative line 303. The armature of magnet 58U will now rise and its pawl will turn gear 52 to advance the control drum one floor-corresponding step, in the manner previously described.

Upon completion of each drum step, the stem 70 of the magnet plunger opens normally-closed contacts 58C, which, in turn, opens the self-holding circuit of drum relay 84U. The plunger of the drum relay in dropping will allow contact pairs 87, 88 to open and jump magnet 58U will, thereupon, become de-energized.

Then, as the car reaches a position nearly opposite the fifth floor, at which a stop is scheduled, the drum is jumped again in the manner described. This movement of the drum will bring the live, floor-corresponding, finger 46C into the gap 29 (see Figure 5) of call unit C of the commutator drum. The call circuit will not be interrupted at this time as it is maintained through the hold-over relay 98 and contacts 100, as previously described. Live floor-corresponding finger 46D will rest, at this time, in the gap 35 of the said dispatch section of the drum. This, on an initial or farthest "wrong direction" call i. e. a call in the direction opposite to car-corresponding direction, will cause the negative side of the line leading to the direction and potential relays, to open, whereupon said relays are de-energized the circuit to the direction and potential switches is broken at up direction relay contacts 73U and potential relay contacts 77. The switches will drop out, cutting off the supply of current to the motor and the car will come to a stop, level with the floor landing.

It is the purpose of the invention to provide a system in which quick reversal of direction of car travel is avoided by timing the operation of direction-control circuits. In the arrangement shown this is accomplished by a criss-cross circuit for the direction relays, in which contacts 101, 102 are controlled by time elements directly connected to the plungers of the direction relays. Throughout the energization period of direction relay 71U, contacts 101 arranged below were open, which in turn, opened the criss-cross circuit for energizing down direction relay 72D. Now, upon relay 71U becoming de-energized, its directly connected time-element will function and the contacts 101 will be maintained open for an interval of time. During this period prior-energized relay 71U will be established in preferred operating position.

Means are provided for avoiding simultaneous energization of the gate closer and gate opener magnets and for providing a period of time, after opening of the car gate, before the car gate can re-close.

As potential switch 7P dropped out, as above described, it closed contacts 150, to complete a circuit to the gate-opener magnet 81 leading from the positive side through line 207, the coil of gate opener magnet 81, wire 327, contacts 82 of gate closer magnet 80, wire 328, now-closed gate contacts 152, wiring 309, potential switch contacts 150, wire 301 and back contacts 103 of gate-closer relay 80 to negative line 303. The gate opener relay 81 will now be energized to close at its contacts 81A, 81B, a circuit for the gate motor GM for opening of the car gate.

Until the gate has started its opening movement and opened contacts 151 of the gate, the hold-over relay 98 remains energized, holding open the normally closed contacts 99, in the positive side of the line leading to the gate closer magnet 80.

Accordingly, when the car comes to a stop the positive side of the line leading to the gate closer magnet is already open at the contacts 99 controlled by the hold-over relay. After the gate opening magnet is energized it opens its contacts 104 also in the positive line leading to the gate closer magnet. After a time interval provided by the opening movement of the gate, gate contacts 151 will be opened, thereby deenergizing hold-over relay 98 and the contacts 99 of the relay will then close, but the positive side of the gate closer magnet circuit remains open at the contacts 104.

The energizing circuit for the gate opener magnet 81 is broken as the gate completes its opening movement and opens gate contacts 152. Its plunger will drop and its time element will then function. After a predetermined period of time the contacts 104 will be re-closed by the time element and the circuit for energizing the gate closer magnet can at contact 76 of potential relay 75 be completed again if another call is entered.

Another feature of the invention is to provide a system in which in the event of failure of the car to start in response to calls, after a predetermined period all calls will be automatically canceled. One means in which this can be accomplished is shown by interposing contacts 103 in the main negative line. In the arrangement illustrated these contacts are controlled by a time-element directly connected to the plunger of the gate closer magnet 80. Should the gate in its closing movement be blocked, the gate closing magnet 80 will remain energized and after a period of time its time element, see Figure 8, will act to open normally-closed contacts 103. The opening of these contacts is adapted to break the direct negative line and as a result all active coils will become de-energized, all then registered, unanswered calls are cancelled, and the controller is rendered inoperative until the gate is permitted to complete its closing movement.

If instead of a single "wrong direction" call, i. e. for the direction opposite to car-corresponding direction, as described above, a series of calls of such type were entered, the calls would be first registered at call unit C of the commutator, then upon closure of the gate and energization of hold-over relay 98 to close pairs of floor-corresponding contacts 100, as described, a plurality of parallel circuits will be established for the originally completed call circuits. As the car reaches each call floor prior to the farthest wrong direction call-floor, a floor-corresponding finger 46C will rest in a dead spot of the call unit C and the floor-corresponding contact will at this time establish a bypass for this call circuit to hold a call registered. The finger 46D corresponding to the particular floors will also, at such time, rest in the gap 35 of the dispatch section D of the drum, but one or more live fingers corresponding to farther calling floor will rest on a contact plate of drum section D and the circuit for the then-energized direction relay will remain unbroken and travel of the car in the established direction will be maintained until the car reaches the floor from which the farthest "wrong direction" call has been entered. Upon arrival at the latter floor stopping of the car will take place in the manner previously described. The remaining calls corresponding to floors which were passed during this operation will have been stored and remain registered through the described action of the call section C and hold-over relay 98. If, then no further calls have been entered for the established direction, the direction of car travel will be reversed, the previously referred to passed calls will become "right direction" calls i. e., calls in car-corresponding direction and will be answered as now about to be described in the order of the arrival of the car at the calling floors.

If the original fifth floor down call had been entered as an up call, i. e. a "right direction" call, the previously described operations would be the same in all respects, with the exception that separate means are provided to control the stopping of the car. These means comprise the stop initiating of the control drum. The arrangement of unit S. both occurrences is such, that when the car is at a landing, a contact finger or fingers 46S, corresponding to the adjacent floor, or floors, rests on a contact spot, or spots, of the section. When, as before, the car is at rest at the basement, see Figure 5, a finger 46S corresponding to the first floor rests on a contact spot of row 40U. As the car in responding to the fifth floor call reaches the fourth floor an up finger finger 46S corresponding to the fifth floor will rest on a contact spot 40U and a circuit will then be closed for energizing a stopping magnet 90, the circuit, in the arrangement shown, being completed one floor in advance of the scheduled stop. This circuit leads from positive line 206 and through the coil of stopping magnet 90. In the form illustrated, the circuit is shown continuing from the magnet 90 through lead 316, normally-closed contacts 96, above relay 91, wire 321, normally-closed contacts 89 above the drum relays 84U, 85D, wire 322, now-closed contacts 154 of the up direction switch, wire 323U, feed strip finger 46S of the up series, up feed strip 43, conductor 42, contact spots 40U, the finger of series 46S associated with the fifth floor up magnet 5U, wire 324, closed contacts 20 above the said floor magnet, and wiring 325, 301, contacts 103 and wiring 303 to the negative side of the line.

One side of the stopping magnet is connected through switch contacts 154, 155, with the up division and down division, respectively, of the stop section, and these divisions are adapted to be connected through contacts controlled by up call and down call floor relays, respectively, with a return line to a current source.

The plunger of magnet 90 closes contacts 94, 93, 92, the latter closing a self-holding circuit, connecting lead 316 with negative line 317 normally closed contacts off the jump magnets 57D, 59U to negative line 303, the circuit continuing through line 317, through normally-closed contacts 57C, 58C of the jump magnets to return line 308. Contacts 93 complete a circuit for energizing relay 91, this circuit running from positive line 306, through the magnet coil, wire 326, and contacts 98 to negative line 314, and contacts 94 complete a bypass for an original control circuit for the car running circuit switches.

Magnet 91 actuates three pairs of contacts, contacts 96 of which close a self-holding circuit, connecting lead 326 to negative line 314. Normally-closed contacts 96, 97 are opened, the latter forming part of the negative side of the direction and potential switch circuits, the circuit, at this time, being bypassed, as described, through the previously closed contacts 94 above now energized stopping magnet 90.

As the car reaches the fifth floor, jump magnet 59U will be energized, as described, the drum will be advanced a step and the stem of the magnet plunger will open its pair of normally-closed contacts 89C. Contacts 96 above magnet 91 in the original energizing circuit for stop magnet 90 having been previously opened and contacts 58C having opened the self-holding circuit, the negative side of the line leading to the stopping magnet 90 will be opened and the magnet will become de-energized. Contacts 94 above magnet 90 now open the bypassed negative line of the potential and direction switch circuits, whereupon the current supply to the motor will be cut off, and intercept the car.

It will be apparent from the above that the magnet 90 serves, with respect to "right direction" calls, to duplicate the operation of one or the other of the direction relays, with respect to "wrong direction" calls. This establishes a substantially uniform time period in which the stopping of the car is accomplished. The arrangements described, in conjunction with the provision of a one to one relation between the movement of the car and turning of the control drum, enables accurate and level floor stops to be effected in response to "right direction" and "wrong direction" calls.

When the car comes to a stop in response to a "right direction" call, the magnet 91 will remain energized, through its self-holding circuit until after the gate opening magnet has been energized and the gate has opened to open gate contacts 151. This arrangement insures proper response to and stopping of the car on "right direction" calls.

If a series of "right direction" calls are entered, these, as will be clear from the foregoing description, will be answered sequentially, notwithstanding that intervening "wrong direction" calls may also be entered.

Another feature of the invention resides in the arrangement of the contacts above the drum relays 84U, 85D. As shown, see Figure 2, contacts 86 of the self-holding circuits for the relays are arranged above the contacts associated with the relays for energizing the jump magnets. Accordingly, the self-holding circuit for an energized drum relay must, upon de-energization of the relay, open before the jump magnet energizing circuit can open and the contacts 58C, above the jump magnet 58U, re-close. This avoids possible double jumping of the drum. The contacts 89 above each drum relay are normally closed and form part of the energizing circuit for energizing relay 90. Hence, when a drum relay is energized a pair of the contacts 89 will be open and the relay can not be energized, thus preventing possible false stopping of the car.

It will be observed, that in accordance with the invention the pressing of a car button for an intermediate floor and the pressing of the corresponding buttons at the landing will cause the energization of two floor relays corresponding to the floor. Upon the car gate being automatically closed the calls are transferred from the call section of the commutator through a pair of floor-corresponding contacts actuated by the holdover relay. When the car comes to rest at the floor, the gate in its opening movement will cause the holdover relay to be deenergized, separating the floor-corresponding contacts. The opening of the floor-corresponding contacts will open the circuit for the two energized floor relays, and all calls for the floor will be canceled after the car has stopped at the floor.

As has been described, all calls can be entered except from a landing corresponding to the position of the car at rest, the system, in this respect, is full-collective. The call section of the drum and the hold-over relay cooperate to store and hold registered calls until answered, whereby the controller is full-cumulative and, the controller is adapted to so govern the movements of the car that it will answer in sequence calls entered in car corresponding direction and will first respond to the farthest call in a direction opposite to responding direction, whereby the system is full-selective. A full-collective, full-cumulative, full-selective, single push control system is thus provided, which, in operation, avoids multiple direction reversals of the car, saves mileage, and adequately meets the requirements of passenger convenience.

Other advantages of the system are the provision of a controller of standardized construction, in which the use of special parts is avoided, the absence of flashing on sliding contacts, the comparatively noiseless operation of the parts, and the provision of adjustable safety time protection on all operations where desirable, the latter being effected in a simple and positive manner, without the use of dashpots or additional magnets.

Having thus described the construction, arrangement and operation of the system, it will be understood that various changes can be made in carrying the invention into effect, without departing from the principle thereof.

What is claimed is:

1. In an elevator control system the combination with a car, a hoisting motor therefor and a gate on the car, of control circuits comprising an up and a down floor relay corresponding to each of a plurality of floors, up and down contacts individually operable from each of said floors to close a circuit for an associated floor relay, floor corresponding contacts in the car, the car contacts for a floor being operable to jointly close circuits for the up and the down relay for each of said floors, a commutating machine comprising a rotatable drum having call storing, car dispatch and car intercepting units, the call storing unit being in circuit relation with the floor relays, pairs of floor corresponding contacts adapted to be closed during movement of the car to establish parallel call circuits, said last-named pairs of contacts cooperating to store and cancel calls, contacts controlled by each floor relay for completing one side of a circuit comprising the car dispatch unit and part of one side of a circuit comprising the car intercepting unit of the commutator, car running circuits controlled by a plurality of switches, switch circuits controlled by an up and a down direction relay, means controlled by said car dispatch unit for selectively completing a direction circuit through a direction relay, each of the direction relays, when energized, being adapted to complete a circuit for another switch relay, the last-named switch relay being adapted to first close a by-pass for and then open the direction relay circuit, and to thereafter reroute the positive side of the direction relay circuit to complete a circuit for a gate closing magnet, said last-named circuit comprising pairs of normally-closed contacts, said gate closing magnet controlling means for closing the gate, means conditioned on closure of the gate for completing said switch circuits to close a car running circuit, means for effecting floor by floor, step movements of the drum comprising a pair of jump magnets and pawl and ratchet mechanism controlled thereby, means for transmitting energizing impulses to said jump magnets, selectively in accordance with direction of car travel, said means comprising up and down obstruction members adjacent each floor and cooperating circuit-closing members carried by the car, means whereby the car dispatch unit is adapted to open-circuit an energized direction relay to initiate stopping of the car on a call registered opposite to car corresponding direction, and separate means for intercepting the car in response to calls in car corresponding direction, said means comprising the car intercepting unit of the commutator, means controlled by said unit for energizing in advance of each of said last-named stops, one of a plurality of stop magnets to first close a by-pass for the original switch circuit, an energizing circuit for a second stop magnet, and a self-holding circuit for the first-named stop magnet, said second stop magnet being adapted to open the original, now bypassed, switch circuit, open the initial circuit for the first stop magnet and close a self-holding circuit for itself, contacts operable by each of said jump magnets to open the self-holding circuit and de-energize the first stop magnet to open the switch circuit bypass and intercept the car, means for energizing a magnet to control opening of the car gate, and means operable thereafter to open the self-holding circuit of the second stop magnet.

2. In an elevator control system the combination with a car, a hoisting motor therefor and a gate on the car, of control circuits comprising an up and a down floor relay corresponding to each of a plurality of floors, up and down contacts individually operable from each of said plurality of floors to close a circuit for an associated floor relay, floor-corresponding contacts in the car, the car contacts corresponding to each of said floors being operable to jointly close circuits for the up and the down relay corresponding to a floor, a commutating machine comprising a rotatable drum having call storing, car dispatch and car intercepting units, the call storing unit being in circuit relation with the floor relays, pairs of floor-corresponding contacts adapted to be closed during movement of the car to establish parallel call circuits, said last named pairs of contacts cooperating to store and cancel calls, contacts controlled by each floor relay for completing one side of a circuit comprising the car dispatch unit, and part of one side of a circuit comprising the car intercepting unit of the commutator, car running circuits controlled by a plurality of switches, switch circuits controlled by an up and down direction relay, means controlled by the car dispatch unit for selectively completing a circuit for a direction relay, each of the direction relays, when energized, being adapted to complete a circuit for another switch relay, said last-named switch relay being adapted to first close a bypass for and then open the direction relay circuit, and to thereafter reroute the positive side of said direction relay circuit, to complete a circuit for a gate closing magnet, the last named circuit comprising pairs of normally closed contacts, said gate closing magnet controlling means for closing the car gate, means conditioned on closure of the gate for completing said switch circuits to close a car running circuit, means for effecting floor by floor, step movements of the commutator drum, comprising a pair of jump magnets and pawl and ratchet mechanism controlled thereby, means for transmitting energizing impulses to said jump magnets, selectively in accordance with the direction of car travel, said means comprising up and down obstruction members adjacent each floor and cooperating circuit-closing members carried by the car, means whereby the car dispatch unit is adapted to open-circuit an energized direction relay to initiate stopping of the car on a call registered opposite to car corresponding direction, and separate means for intercepting the car in response to calls in car corresponding direction, said means comprising the car intercepting unit of the commutator, means controlled by said unit for energizing in advance of one of said last-named stops, one of a plurality of stop magnets, said magnet being adapted to first close a bypass for the original switch circuit, an energizing circuit for the second stop magnet, and a self-holding circuit for the first-named stop magnet, said second stop magnet being adapted to open the original, now bypassed, switch circuit, open the initial circuit for the first stop magnet and close a self-holding circuit for itself, contacts operable by each of said jump magnets to open the self-holding circuit and de-energize the first stop magnet and open the switch circuit bypass to intercept the car, a circuit comprising gate contacts and back contacts of one of said switches for energizing a magnet for controlling opening of the gate, means operable thereafter to open the self-holding circuit of the second stop magnet to reclose a part of the original switch circuit, and time-controlled contacts adapted to thereafter reclose a part of the circuit for the gate closing magnet and prepare said circuit for completion by one of said switch relays.

3. In an elevator control system the combination with a car, a hoisting motor therefor and a gate on the car, of control circuits comprising an up and a down floor relay corresponding to each of a plurality of floors, up and down contacts individually operable from each of said plurality of floors to close a circuit for an associated floor relay, floor-corresponding contacts in the car, the car contacts corresponding to each of said floors being operable to jointly close circuits for the up and the down relay corresponding to a floor, a commutating machine comprising a rotatable drum having call storing, car dispatch and car intercepting units, the call storing unit being in circuit relation with the floor relays, pairs of floor corresponding contacts adapted to be closed during movement of the car to establish parallel call circuits, said last-named contacts cooperating to store and cancel calls, contacts controlled by each of the floor relays for completing one side of a circuit comprising the car dispatch unit, and part of one side of a circuit comprising the car intercepting unit of the commutator, car running circuits controlled by a plurality of switches, switch circuits controlled by an up and a down direction relay, means controlled by the car dispatch unit for selectively completing a circuit for each direction relay, each of the direction relays, when energized, being adapted to complete a circuit for another switch relay, the last-named switch relay being adapted to first close a bypass for and then open the direction relay circuit, and to thereafter reroute the positive side of the said direction relay circuit to complete a circuit for a gate closing magnet, the last-named circuit comprising pairs of normally closed contacts, said gate closing magnet controlling means for closing the car gate, means conditioned on closure of the gate for completing said switch circuits to close a car running circuit, means for effecting floor by floor step movements of the commutator drum, comprising a pair of jump magnets and pawl and ratchet mechanism carried thereby, means for transmitting energizing impulses to said jump magnets selectively in accordance with the direction of car travel, said means comprising up and down obstruction members adjacent each floor and up and down flexible circuit-closing members on the car, means controlled by the car dispatch unit to open the circuit of a direction relay to stop the car in response to a call entered opposite to car corresponding direction and separate means comprising the car intercepting unit of the commutator for controlling interception of the car on calls in car corresponding direction.

4. In an elevator control system the combination with a car, a hoisting motor therefor and a gate on the car, of control circuits comprising an up and a down floor relay corresponding to each of a plurality of floors, up and down contacts individually operable from each of said plurality of floors to close a circuit for an associated floor relay, floor-corresponding contacts in the car, the car contacts corresponding to each of said floors being operable to jointly close circuits for the up and the down relay corresponding to a floor, a commutating machine comprising a rotatable drum having call storing, car dispatch and car intercepting functions, pairs of floor-corresponding contacts adapted to be closed during movement of the car to establish parallel call circuits, said last-named pairs of contacts cooperating with the commutator to store and cancel calls, car running circuits controlled by a plurality of switches, switch circuits controlled by an up and a down direction relay, means controlled by the commutator for selectively completing a circuit for each direction relay, each of the direction relays, when energized, being adapted to complete a circuit for another switch relay, the last-named relay being adapted to first close a bypass for and then open the direction relay circuit, and to thereafter reroute the positive side of said direction relay circuit to complete a circuit for a gate closing magnet, said gate closing magnet controlling means for closing the car gate, means conditioned on closure of the gate for completing said switch circuits to close a car running circuit, means for effecting clockwise and anti-clockwise step movements of the commutator drum, said means being controlled by the movement and direction of travel of the car and means controlled by said commutator machine to initiate stopping of the car on a call registered opposite to car corresponding direction and to intercept the car in successive response to calls in car corresponding direction.

5. In an elevator control system the combination with a car, a hoisting motor therefor, and a gate on the car, of control circuits comprising an up and a down floor relay corresponding to each of a plurality of floors, up and down contacts individually operable from each of said plurality of floors to close a circuit for an associated floor relay, floor-corresponding contacts in the car, the car contacts corresponding to each of said floors being operable to jointly close circuits for the up and the down relay corresponding to a floor, a commutating machine comprising a rotatable drum having call storing, car dispatch and car intercepting functions, pairs of floor-corresponding contacts adapted to be closed during movement of the car to establish parallel call circuits, said last-named pairs of contacts cooperating with the commutating machine to store and cancel calls, car running circuits, controlled by a plurality of switches, switch circuits controlled by an up and a down direction relay, means controlled by the commutator for selectively completing a circuit for each direction relay, a gate closing and a gate opening magnet, means operable after energization of one of said direction relays to close a circuit for the gate closer magnet, means controlled by the gate closer magnet for closing the gate, means conditioned on closure of the gate for completing a car running circuit, means for effecting clockwise and anti-clockwise step movements of the commutator drum, said means being controlled by the movement and direction of travel of the car, and means controlled by the commutator machine to initiate stopping of the car on a call entered opposite to car corresponding direction and to intercept the car in successive response to calls in car corresponding direction.

6. In an elevator control system the combination with a car, and a hoisting motor therefor, of control circuits comprising a plurality of floor relays, a commutating machine having call storing and car dispatch units and means operable from each of said floors and from the elevator car for controlling said circuits, said commutating machine comprising a rotatable drum, means controlled by the movement and direction of travel of the car for effecting clockwise and anti-clockwise step movements of the drum, said call storing and car dispatch units being spaced, one from the other, about a circumferential portion of the drum, each of said units comprising two spaced metal plates, each having a stepped adjoining edge providing a staggered floor-corresponding insulated section between the plates of each unit, and stationary, floor-corresponding contact elements in circuit relationship to said floor relays and cooperating with the plates and insulated section of each of said units.

7. In an elevator control system the combination with a car, of call circuits comprising a plurality of floor relays, a commutating machine actuated by the movement of the car, having a call storing unit and means normally operable at all times from each of a plurality of floors and from an elevator car to close call circuits to register calls for one or more floors, and said call storing unit comprising two metal plates, each plate having a stepped adjoining edge providing a staggered, floor-corresponding insulated section containing arc-resistance material between the plates, and stationary floor-corresponding contact elements in circuit with said relays and arranged in permanent contacting relation to said call storing unit.

8. In an elevator control system the combination with a car, of call circuits comprising an up relay and a down relay corresponding to each of a plurality of floors, a commutating machine actuated by the movement of the car having a call storing unit, and means normally operable at all times from each of said floors and from the elevator car to close call circuits to register calls for one or more floors, said call storing unit comprising two spaced metal plates, each plate having a stepped adjoining edge, providing a staggered floor-corresponding insulated section containing arc-resisting material, cooperating contact elements, one corresponding to each floor arranged in permanent contacting relation to said call storing unit and means for conductively connecting one of said floor-corresponding contact elements with the up and the down relay corresponding to each of said plurality of floors.

9. In an elevator control system the combination with a car, of call circuits comprising an up relay and a down relay corresponding to each of a plurality of floors, a commutating machine reversibly actuated by the movement of the car having a call storing unit, push buttons operable from each of said floors and from an elevator car for closing said circuits, push button shunting circuits and additional cooperating call storing means corresponding and individual to each of said floors, each of said additional cooperating call storing means being adapted while the car is passing its corresponding floor, to establish a bypass for a corresponding call circuit to hold a registered call entered from said floor in a direction opposite to car corresponding direction.

10. In an elevator control system the combination with a car of call circuits comprising an up relay and a down relay corresponding to each of a plurality of floors, a commutating reversibly machine having a call storing unit, means operable from each of said floors and from the car for closing said circuits, and pairs of floor corresponding contacts operable to be closed during movement of the car to establish parallel call circuits by-passing said call storing unit, each of said parallel circuits being adapted, while the car is passing a corresponding floor to establish a bypass for its corresponding call circuit to hold a call registered from said floor in a direction opposite to car corresponding direction.

11. In an elevator control system the combination with a car, of call circuits comprising an up relay and a down relay corresponding to each of a plurality of floors, a commutating machine, and means operable from each of the floors and from the car for closing said circuits, and pairs of floor corresponding contacts adapted to be closed during the movement and to be opened during stop periods of the car to cooperate with the commutator to store and cancel calls, said contacts when closed providing parallel call circuits and each of said parallel circuits being adapted to establish a bypass for its corresponding call circuit to hold a call registered from said floor in a direction opposite to car corresponding direction, and being thereby adapted to relieve the commutator unit of current load.

12. In an elevator control system the combination with a car, of call circuits comprising an up relay and a down relay corresponding to each of a plurality of floors, a commutating machine, and means operable from each of the floors and from the car for closing said circuits, and pairs of floor-corresponding contacts adapted to be closed during movement of the car to cooperate with and relieve said commutating machine of load and potential, said machine comprising a unit having movable conductor members and stationary contact elements, means for connecting a common floor-corresponding contact element with the up and the down relay corresponding to each of said plurality of floors, and means for connecting a common pair of floor-corresponding cooperating contacts with the said up and the said down relay corresponding to each of said plurality of floors.

13. In an elevator control system the combination with a car, of call circuits comprising an up relay and a down relay corresponding to each of a plurality of floors, a commutating machine having a call storing unit, means operable from the floors and from the car for closing said circuits, and pairs of floor-corresponding contacts adapted during movement of the car to establish parallel call circuits and to open said circuits during stop periods of the car, each of said parallel circuits being adapted, while the car is passing a corresponding floor, to establish a bypass for its corresponding call circuit to hold a registered call entered from said floor in a direction opposite to car corresponding direction and being adapted upon interception of the car to cancel the calls entered for the floor at which the car is stopped.

14. In an elevator control system, the combination with a car, of call circuits comprising an up relay and a down relay corresponding to each of a plurality of floors, a commutating machine reversibly actuated by the movement of the car having a call storing unit in circuit relation with said floor relays, circuit closing means comprising up and down contacts individually operable from each of said plurality of floors to close the circuit for an associated floor relay, and floor-corresponding contacts in the car, the car contacts corresponding to each of said plurality of floors being operable to jointly close the circuits for the up relay and the down relay corresponding to a floor, and means carried by said call storing unit operable upon stopping the car to open circuit and cause deenergization of the floor relay or floor relays corresponding to each of said plurality of floors at which the car stops.

15. In an elevator control system the combination with a car and a hoisting motor therefor, of control circuits comprising a plurality of floor relays, a commutating machine having call storing and car dispatch units, means operable from a plurality of floors and from the car for controlling the closing of said circuits, car running circuits comprising up and down direction switches, circuits for actuating said switches comprising an up direction and a down direction relay, means controlled by said car dispatch unit for selectively closing one side of a circuit for a direction relay, the other side of the original circuit for said direction relays comprising normally closed contacts of another switch relay, the circuit for said other switch relay being controlled by energization of a direction relay, whereby said other switch relay is energized following energization of a direction relay, said other switch relay, when energized, being adapted to first close a bypass for the direction relay circuit and to thereafter open the direction relay circuit at the said normally closed contacts.

16. In an elevator control system the combination with a car, a hoisting motor therefor, a gate carried by the car, and operating mechanism for opening and closing the gate, of control circuits comprising a plurality of floor relays, a commutating machine having call storing and car dispatch units, means operable from a plurality of floors and from the car for controlling the closing of said circuits, said control circuits comprising car running circuits including up and down direction switches, circuits for actuating said switches comprising an up direction and a down direction relay, means controlled by said car dispatch unit for selectively closing one side of a circuit for the direction relays comprising normally closed contacts of another switch relay, the circuit for said other switch relay being controlled by energization of a direction relay, whereby said other switch relay is actuated after energization of a direction relay and, when energized, is adapted to first close a bypass for the direction relay circuit, thereafter open the direction relay circuit at the said normally closed contacts and then reroute one side of said direction relay circuit to complete a circuit for a gate closing magnet, the gate closing magnet being adapted to control said operating mechanism for closing the car gate.

17. In an elevator control system the combination with a car, a hoisting motor therefor, a gate carried by the car and operating mechanism for opening and closing the gate, of control circuits comprising a plurality of floor relays, a commutating machine, actuated by movement of the car and having call storing and car dispatch units, means operable from a plurality of floors and from the car for controlling the closing of said circuits, a gate opening and a gate closing magnet, car running circuits comprising up and down direction switches, circuits for actuating said switches including up and down direction relays, means controlled by a switch relay for rerouting one side of the direction relay circuit to close a circuit for the gate closing magnet, means conditioned on closure of the car gate to complete a car running circuit, and means to open the gate closing magnet circuit, means for intercepting the car, and means conditioned on opening of the car running circuit for closing a circuit for the gate opening magnet, and means controlled by the gate in its opening movement for reclosing a part of the circuit for the gate closing magnet.

18. In an elevator control system the combination with a car, a hoisting motor therefor, a gate carried by the car and operating mechanism for opening and closing the gate, of control circuits comprising a plurality of floor relays, a commutating machine actuated by movement of the car and having call storing and car dispatch units, means operable from a plurality of floors and from the car for controlling the closing of said circuits, car running circuits comprising up and down direction switches, circuits for actuating the switches including up and down direction relays controlled by said car dispatch unit, a gate opening and a gate closing magnet, means controlled by one of said direction relays for controlling the circuit for the gate closing magnet, to actuate said operating mechanism for closing the gate, means conditioned on closing of the gate to complete a car running circuit, means adapted upon completion of a car running circuit to provide openings in the circuit for the gate closing magnet, means for intercepting the car, means conditioned on opening of the car running circuit for closing a circuit for the gate opening magnet and closing one of said openings in the gate closing magnet circuit, means controlled by energizing of the gate opening magnet for providing another opening in the gate closing magnet circuit, means operable by the gate in its opening movement to close another of the first-named openings in the gate closing magnet circuit, providing a time interval, and means operable at the termination of the gate opening movement to open the circuit for the gate opening magnet, the gate opening magnet being adapted to close another opening in the gate closing magnet circuit, and prepare said circuit for completion.

19. In an elevator control system the combination with a car, a hoisting motor therefor, a gate carried by the car and operating mechanism for opening and closing the gate, of control circuits comprising a plurality of floor relays, a commutating machine actuated by movement of the car, and means operable from a plurality of floors and from the car for controlling the closing of said circuits, a gate closing magnet and a gate opening magnet for controlling the gate operating mechanism, car running circuits comprising up direction and down direction switches, and circuits for actuating said switches comprising up and down direction relays, means controlled by a car dispatch unit of the commutator for selectively energizing said direction relays, means controlled by a direction relay when energized for closing a circuit for the gate closing magnet, means conditioned on closure of the car gate to complete a car running circuit, a plurality of means operable upon completion of a car running circuit to provide openings in the circuit for the gate closing magnet, means conditioned on interruption of the car running circuit for closing a circuit for the gate opening magnet and for closing one of said openings in the gate closing magnet circuit, means controlled by the gate opening magnet, when energized, for providing another opening in the gate closing magnet circuit means controlled by the gate during the beginning of its opening movement for closing, after a time period, another of said first-named openings in the gate closing magnet circuit, means operable at the termination of the gate opening movement to open the gate opening magnet circuit, and means conditioned by the gate opening magnet being deenergized, and the circuit for one of said direction relays being closed, for completing the circuit for the gate closer magnet.

20. In an elevator control system the combination with a car, a hoisting motor therefor, a gate on the car and operating mechanism for the gate, of call circuits comprising a plurality of floor relays, a commutating machine actuated by movement of the car, car running circuits comprising up and down direction switches, means for selectively controlling said switches to complete a car running circuit, means for intercepting the car, a gate opening magnet and a gate closing magnet, means conditioned on interception of the car for closing a circuit for the gate opening magnet to actuate said gate operating mechanism for opening the gate, means operable at the termination of the gate opening movement to open circuit the gate opening magnet, means conditioned by the gate opening magnet being deenergized for closing a circuit for the gate closing magnet, and means operable upon the gate closing magnet remaining energized for a definite period beyond the closing movement time of the gate, to open the circuits for all energized floor relays to cancel all registered calls, said means comprising time-controlled mechanism directly connected to the armature of said gate closer magnet, and a pair of normally closed contacts controlled thereby.

21. In an elevator control system the combination with a car and a hoisting motor therefor of call circuits, car running circuits, a commutator comprising a rotatable drum having a plurality of units, each comprising drum conductor members and cooperating, stationary, floor-corresponding contact elements, said call circuits comprising a call storing unit of the commutator, a plurality of floor relays, and means operable from each of a plurality of floors and from the car for closing the call circuits, means controlled by each of the floor relays for closing one side of a circuit through a car dispatch unit, and means controlled by each of said floor relays for closing a part of one side of a circuit comprising a car intercepting unit, of the commutator, up and down obstruction members adjacent the floors, and flexible circuit-closing elements carried on the car for transmitting energizing impulses selectively to up and down drum-jump relays, up and down jump magnets each adapted to be energized by a direction corresponding drum-jump relay, and actuating mechanism controlled by the jump magnets for effecting clockwise and anticlockwise step movements of the commutator drum, in accordance with direction of car travel, said car dispatch unit of the commutator being adapted to selectively control closing of the car running circuits, and to control opening of a car running circuit to stop the car in response to a call registered opposite to car corresponding direction, separate means comprising stop magnets for controlling interception of the car in successive response to calls in car corresponding direction, means for completing an original energizing circuit for one of said stop magnets following a step movement of the drum and in advance of arrival of the car at each of said corresponding direction call floors, said circuit comprising a car intercepting unit of the commutator, contacts controlled by up and down direction switches in the car running circuits and normally-closed contacts associated with each drum-jump relay, each energized drum-jump relay being adapted to open its said normally closed contacts to open circuit said first-named stop magnet and prevent energization thereof during step movements of the drum; to thereafter close an energizing circuit for an associated jump magnet; and then close a self-holding circuit for itself, means comprising normally-closed contacts adapted to be opened by each jump magnet, when energized and upon completion of a step movement of the drum, to open the self-holding circuit for its associated drum-jump relay, the drum-jump relay thereafter interrupting the energizing circuit for its associated jump magnet and thereby insure complete step movement of the drum, and then closing its normally-closed contacts in the energizing circuit for the first-named stop magnet, the first-named stop magnet, when energized, being adapted to first close a bypass for an original car running control circuit, then close an energizing circuit for a second stop magnet and thereafter close a self-holding circuit for itself, said self-holding circuit being common to the first-named stop magnet and the drum-jump relays, the second stop magnet, when energized, being adapted to open the original, now bypassed, car running control circuit, open the original energizing circuit for the first named stop magnet and complete a self-holding circuit for itself, the energization of a direction corresponding drum-jump relay, upon approach of the car to each floor, having a call in car corresponding direction, being adapted to close the energizing circuit for its corresponding jump magnet, the jump magnet advancing the drum a step and thereafter opening its normally-closed contacts to open the common self-holding circuit for its drum-jump relay and said first-named stop magnet, the first-named stop magnet when deenergized being adapted to open the bypass for the car running control circuit and intercept the car.

22. In an elevator control system, the combination with a car, and a hoisting motor therefor, of call circuits, car running circuits, a commutator comprising a rotatable drum having call storing, car dispatch and car intercepting functions, an up and a down drum-jump relay means for energizing each of said drum-jump relay in accordance with the direction of travel of the car, up and down jump magnets each adapted to be energized by a direction corresponding drum-jump relay, and actuating mechanism controlled by the jump magnets for effecting clockwise and anticlockwise floor-corresponding step movements of the commutator drum in accordance with direction of travel of the car, said commutator comprising a unit adapted to selectively control closing of the car running circuits and to control opening of a car running circuit to stop the car in response to a call registered opposite to car corresponding direction, separate means comprising a stop magnet for controlling interception of the car in successive response to calls in car corresponding direction, means for completing an original energizing circuit for said stop magnets following a step movement of the drum and in advance of arrival of the car at each of said corresponding direction call floors, said circuit comprising another unit of the commutator and normally-closed contacts associated with each of said drum-jump relays, each drum-jump relay, when energized, being adapted to open its said normally-closed contacts to open-circuit the said stop magnet and prevent energization thereof during step movements of the drum, to thereafter close an energizing circuit for an associated jump magnet and then close a self-holding circuit for itself, means comprising normally-closed contacts adapted to be opened by each jump magnet when energized, and upon completion of a step movement of the drum to open the self-holding circuit for its associated drum-jump relay, the drum-jump relay thereafter interrupting the energizing circuit for its associated jump magnet to thereby insure complete step movement of the drum and, then closing its normally-closed contacts in the energizing circuit for the said stop magnet, the said stop magnet when energized being adapted to first close a bypass for a car running control circuit, and means acting upon completion of another step floor corresponding movement of the drum to deenergize said stop magnet, open said bypass and intercept the car.

23. In an elevator control system the combination with a car and a hoisting motor therefor, of call circuits, car running circuits, a commutator comprising a rotatable drum, an up and a down drum-jump relay means for energizing each of said drum-jump relay in accordance with the direction of travel of the car, up and down jump magnets each adapted to be energized by a direction corresponding drum-jump relay, and actuating mechanism controlled by the jump magnets for effecting clockwise and anticlockwise floor-corresponding step movements of the commutator drum in accordance with direction of travel of the car, means for selectively closing said car running circuits, means adapted to open a car running control circuit and stop the car in response to a call registered opposite to car corresponding direction, separate means comprising a stop magnet for controlling interception of the car in successive response to calls in car corresponding direction, means for completing an original energizing circuit for said stop magnet following a step movement of the commutator drum and in advance of arrival of the car at each of said corresponding direction call floors, said circuit comprising normally-closed contacts associated with each drum-jump relay, each drum-jump relay being adapted, when energized, to open its normally closed contacts to open-circuit said stop magnet and prevent energization thereof during step movements of the drum, and to thereafter close an energizing circuit for an associated jump magnet, each jump magnet, when energized, being adapted to advance the drum a step and then open normally closed contacts to deenergize its associated drum-jump relay to close the normally-closed contacts in the original circuit for said stop magnet, said stop magnet, when energized, being adapted to close a bypass for an original car running control circuit, and means operable after a subsequent step movement of the drum, to deenergize said stop magnet and open said bypass to intercept the car.

24. In an elevator control system the combination with a car and a hoisting motor therefor, of control circuits comprising a plurality of floor relays, a commutating machine having call storing, car dispatch and car intercepting units, car running circuits comprising up and down direction switches, control circuit means therefor comprising said car dispatch unit, means controlled by movement of the car for effecting floor corresponding step movements of said commutating machine means whereby said car dispatch unit is adapted to control opening of the car running circuit to stop the car in response to a call entered opposite to car corresponding direction, means comprising a stop magnet for controlling interception of the car in response to calls in car corresponding direction, means adapted to hold open the circuit for said stop magnet and prevent energization thereof during floor corresponding step movement of the commutating machine, means for completing the energizing circuit for the stop magnet in advance of each call in car corresponding direction to provide a bypass for an original car running control circuit and means controlled by subsequent movement of the car for de-energizing said stop magnet to open said bypass, intercept the car, and relieve the intercepting unit of circuit breaking.

25. In an elevator control system the combination with a car and a hoisting motor therefor, of control circuits comprising car running circuits, and a control circuit adapted to selectively close said car running circuits, means adapted to open said control circuit to stop the car in response to calls entered in car corresponding direction, said means comprising two pairs of contacts, means operable in advance of each of said last-named calls to open one of said pairs of contacts and means controlled by subsequent movement of the car for thereafter opening said second pair of contacts to open said car running control circuit.

26. In an elevator control system the combination with a car and a hoisting motor therefor, of circuits for said motor, control circuit means therefor, and car-arresting means adapted to initiate interception of the car in successive response to calls in car corresponding direction, said car-arresting means comprising stop magnets, means for energizing one of said magnets in advance of each of said calls in car corresponding direction to complete a bypass for the motor control circuit, an energizing circuit for a second stop magnet and a self-holding circuit for itself, said second stop magnet being adapted to open the original motor control circuit, the initial energizing circuit for the first-named stop magnet and to close a self-holding circuit for itself, and means operable when the car arrives within stopping distance of the floor to open-circuit the self-holding circuit for the first-named stop magnet and thereby open the bypass for the motor control circuit, to intercept the car.

27. In an elevator control system the combination with a car and a hoisting motor therefor, of circuits for the motor, control circuit means therefor, and car-arresting means adapted to initiate interception of the car in successive response to calls in car corresponding direction, said means comprising stop magnets, means for closing an initial circuit for one of said magnets in advance of each of said calls to complete a bypass for the original motor control circuit, to close an energizing circuit for a second stop magnet, and to close a self-holding circuit for itself, said second stop magnet being adapted to open the original control circuit means and the initial circuit for the first-named magnet and to close a self-holding circuit for itself, means acting subsequently and controlled by movement of the car to open-circuit said first-named stop magnet and thereby open the bypass circuit, to intercept the car, and time-controlled means operable, after an interval of time to open the self-holding circuit for the second-named stop magnet and thereby reclose part of said original motor control circuit means.

28. In an elevator control system the combination with a car, a hoisting motor therefor, a gate and operating mechanism for causing opening and closing movements of the gate, of control circuits comprising a plurality of electro-magnets, a commutating machine, and contacts controlled by the movement of the gate and operable into circuit closing engagement only at the end of one of the said movements of the gate to initiate a time interval control, for another circuit of the system.

29. In an elevator control system the combination with a car and a hoisting motor therefor, of control circuits comprising a commutator machine, and means for actuating the commutator comprising an up direction and a down direction obstruction member arranged adjacent each of a plurality of floors, an up switch and a down switch carried on the car, each comprising a flexible member, adapted to engage the up and the down obstruction members respectively in accordance with direction of travel of the car, to transmit selective energizing impulses, an up jump magnet and a down jump magnet adapted to be selectively energized by said impulses, and actuating mechanism carried by each jump magnet for effecting floor-corresponding step movements of the commutator in opposite directions in accordance with the direction of travel of the car.

30. In an elevator control system the combination with a car and a hoisting motor therefor, of control circuits, comprising a commutator machine, and means for actuating the commutator comprising an up direction and a down direction obstruction member arranged adjacent each of a plurality of floors, means carried by the car for engaging said members selectively in accordance with direction of travel of the car to transmit energizing impulses, an up jump magnet and a down jump magnet adapted to be respectively energized thereby, and actuating means carried by each jump magnet for effecting floor-corresponding step movements of the commutator in opposite directions, selectively in accordance with direction of travel of the car.

31. In an elevator control system the combination with a car, and a hoisting motor therefor, of control circuits comprising a commutator machine, and means for actuating the commutator comprising a set of up direction and a set of down direction obstruction members, one member of each set being arranged adjacent each of a plurality of floors, and a plurality of members of the up direction set and a plurality of members of the down direction set being arranged adjacent the upper and lower terminals, respectively, circuit-closing means carried by the car for engaging said up direction and said down direction members, selectively in accordance with direction of travel of the car, to transmit an energizing impulse at each of said plurality of floors and a plurality of energizing impulses at each of said terminals, an up jump magnet and a down jump magnet, adapted to be selectively energized thereby, and actuating mechanism carried by each jump magnet for effecting floor-corresponding step movements of the commutator in opposite directions in accordance with the direction of travel of the car.

32. In an elevator control system, the combination with a car of call circuits comprising an up relay and a down relay corresponding to each of a plurality of floors, a call storing unit comprising a movable contact member and cooperating, floor-corresponding contact elements, means for conductively connecting one of said contact elements with the up and the down relay corresponding to each of said plurality of floors, and means for closing said call circuits comprising up and down contacts operable from each of said plurality of floors to close a circuit for a corresponding floor relay, and floor-corresponding contacts in the car, the car contacts corresponding to each of said plurality of floors being operable to jointly close the circuits to the floor-corresponding up and down relay, and means carried by said call storing unit operable upon the stopping of the car to open circuit and cause deenergization of the floor relay or floor relays corresponding to each of said plurality of floors at which the car stops.

33. In an elevator control system, the combination with a car of call circuits and direction circuits, said call circuits comprising an up relay and a down relay corresponding to each of a plurality of floors, a call storing and a car dispatch unit, each comprising a movable contact member and floor-corresponding contact elements, a pair of contacts controlled by each of said floor relays, means for conductively connecting one of the contact elements of the call storing unit with the up and the down relay corresponding to each of said plurality of floors, means for conductively connecting one of the contact elements of said car dispatch unit with one contact of the pair of contacts controlled by the up and by the down relay corresponding to each of said plurality of floors, and means for closing said call circuits comprising up and down contacts operable from each of said plurality of floors to close a circuit for a corresponding floor relay, and floor-corresponding contacts in the car, the car contacts corresponding to each of said plurality of floors being operable to jointly close the circuits for the floor-corresponding up and down relay, whereby one side of a direction circuit is completed through at least one of said pairs of floor-relay contacts.

34. In an elevator control system, the combination with a car and a hoisting motor therefor, of car running circuits comprising up and down direction switches, circuits for actuating said switches controlled by an up and a down direction relay, respectively, a circuit for each of said relays, one side of the circuit for each relay being normally closed and comprising a pair of normally-closed contacts, a by-pass for the said side of the circuit comprising a pair of normally open contacts, means controlled by the position of the car for selectively completing the other side of the circuit for a direction relay, each relay, when energized, controlling means for first closing the said normally-open contacts to close said by-pass and thereafter open the said normally-closed contacts of the original, normally-closed side of the circuit for the relay.

35. In an elevator control system, the combination with a car movable in a hatchway past a plurality of floors of a commutator comprising a movable element, means controlled by movement of the car for effecting step movements of said element, a car running circuit, means for intercepting the car comprising a magnet and a pair of contacts operable by the magnet to effect interruption of the car running circuit, a circuit for said magnet comprising a pair of normally-closed contacts, and means operable to open said contacts to interrupt the circuit for said magnet and prevent its energization during step movements of the movable element of the commutator.

36. In an elevator control system, the combination with a car movable in a hatchway past a plurality of floors, of a commutator comprising a rotatable drum, means for effecting clockwise and anti-clockwise step movements of the drum, comprising a pair of magnets, and actuating mechanism carried by each magnet, a circuit for each magnet including normally-open contacts, two relays, one controlling the normally-open contacts in the circuit for each of said magnets, means for selectively closing a circuit for each of said relays comprising cooperating elements in the hatchway and on the car, a car running circuit, means for intercepting the car comprising a stop magnet and a pair of contacts operable by said stop magnet to effect interruption of the car running circuit, a circuit for said stop magnet comprising a pair of normally-closed contacts controlled by each of said relays, each relay, when energized, being adapted to first open a pair of the said normally-closed contacts in the circuit for the stop magnet and thereafter close the normally-open contacts in the circuit for an associated drum magnet, whereby energization of the stop magnet is prevented during step movements of the drum.

37. In an elevator control system, the combination with a car movable in a hatchway past a plurality of floors, of a commutator comprising a rotatable drum, means for effecting clockwise and anti-clockwise step movements of the drum, comprising a pair of magnets and actuating mechanism carried by each magnet, a circuit for each magnet comprising normally-open contacts, two relays, one controlling the normally-open contacts in the circuit for each of said magnets, means for selectively closing a circuit for each of said relays, comprising cooperating elements in the hatchway and on the car, car running circuits, means for intercepting the car comprising a stop magnet and a pair of contacts operable by said stop magnet to effect interruption of the car running circuit, a circuit for said stop magnet comprising a pair of normally-closed contacts controlled by each of said relays, each relay when energized, being adapted to first open a pair of the said normally-closed contacts in the circuit for the stop magnet, thereafter close the said normally-open contacts in the circuit for an associated drum magnet and then close a self-holding circuit, said drum magnet, when energized, being adapted to effect a step movement of the drum, and open its pair of normally-closed contacts to open-circuit the self-holding circuit for its associated relay, whereupon the latter interrupts the circuit for the drum magnet and thereafter partially recloses the circuit for the stop magnet.

38. In an elevator control system the combination with a car serving a number of floors, and car starting and stopping mechanism, of control devices and circuits for causing the car to start in response to a call; to stop at floors in response to calls; and to restart after each stop until all calls are answered; said control devices and circuits including an up relay and a down relay for each of several floors; an up switch and a down switch at each of said several floors, each switch at all of the floors except the floor at which the car is located being operable to cause direct energization of a corresponding relay for the floor, to store a call therein; and switches in the car, one for each floor, the switch in the car at all of the floors except the floor at which the car is located being operable to cause direct energization of the up and the down relay for the corresponding floor, to store calls therein, and means operable upon stopping of the car to open circuit and cause deenergization of the floor relay or floor relays corresponding to each of said plurality of floors at which the car stops.

39. In an elevator control system the combination with a car serving a number of floors, and car starting and stopping mechanism, of control devices, and circuits for causing the car to start in response to a call; to stop at floors in response to calls; and to restart after each stop until all calls are answered; said control devices and circuits including an up relay and a down relay for each of several floors, an up switch and a down switch at each of said several floors, each switch at all of the floors except the floor at which the car is located being operable to cause direct energization of a corresponding floor relay to store a call therein; switches in the car, one for each floor, the switch in the car at all of the floors except the floor at which the car is located being operable to cause direct energization of the up and the down relay for the corresponding floor, to store calls therein, means operable upon stopping of the car to open circuit and cause deenergization of the floor relay or floor relays corresponding to each of said plurality of floors at which the car stops, and means for obstructing the energization of any relay and the storing of any call by the actuation of a switch corresponding to the floor at which the car is stopped.

40. In an elevator control system the combination with a car serving a number of floors, and car starting and stopping mechanism, of control devices and circuits therefor for causing the car to start in response to a call; to stop in response to calls; and to restart after each stop until all calls are answered; said control devices and circuits including an up relay and a down relay for each of several floors; an up switch and a down switch at each of said several floors, the switches at all of the floors except the floor at which the car is located being each operable to cause energization of a corresponding relay to store a call therein; switches in the car, one for each floor, the switch in the car at all of the floors except the floor at which the car is located being operable to cause energization of the up and the down relay for the corresponding floor, to store calls therein, means operable upon stopping of the car to open circuit and cause deenergization of the floor relay or floor relays corresponding to each of said plurality of floors at which the car stops; and separate means operable only during movement of the car to maintain all operated relay means energized, to hold the calls stored in the said operated relay means.

41. In an elevator control system the combination with a car serving a number of floors, and car starting and stopping mechanism, of control devices and circuits therefor for causing the car to start in response to a call; to stop at floors in response to calls; and to restart after each stop until all calls are answered; said control devices and circuits including relay means for each floor; a circuit for each of said relays each of said circuits having two branches; manually operable switches for causing energization of corresponding relay means to store calls therein; a commutator machine reversibly actuated by the movement of the car and having a unit controlling one branch of the circuit for each of said relays; and maintaining means corresponding to and individual to each of said floors operable only during movement of the car to maintain closed, the second branch of the circuit for each of said relay means, to hold all operated relays energized and to hold the calls stored therein until each of said calls is answered.

42. In an elevator control system the combination with a car serving a number of floors and car starting and stopping mechanism, of control devices therefor for causing the car to start in response to a call; to stop at floors in response to calls; and to restart after each stop until all calls are answered; said control devices and circuits including relay means for each floor, a branched circuit for each relay; manually operable switches for causing energization of corresponding relays to store calls therein; a commutator machine having a unit comprising a contact section and floor-corresponding insulating sections; floor-corresponding contact fingers for engaging said contact and insulating sections, electrically connected with corresponding relay means, to control one branch of the circuit for each of said relays; maintaining means operable during movement of the car to close a second branch of the circuit for each relay, to maintain operated relays energized, and operable when the car stops at a floor, to open said second branch of the circuits for the relays; and means governed by movement of the car for causing intermittent operation of the commutator to cause the engagement of a floor-corresponding contact finger and insulating section of the commutator unit to open the first branch of the circuit for only the relay means corresponding to a floor, whereby said maintaining means and said commutator unit cooperate to cause deenergization of operated relay means corresponding to a floor at which the car is stopped, and to maintain the relay means energized, to hold the calls stored in any operated relay means corresponding to other floors.

43. In an elevator control system the combination with a car serving a number of floors, an automatically actuated gate for the car, and car starting and stopping mechnism, of control devices and circuits for causing the car to start in response to a call; to stop at floors in response to calls; and to restart after each stop until all calls are answered; said control devices and circuits including relay means for each floor; switches for causing energization of corresponding relay means; means for causing the gate to automatically close; maintaining means responsive to the automatic closing of the gate for holding operated relay means energized during movement of the car; means for causing the gate to open automatically when the car stops at a floor; and means controlled upon opening of the gate for rendering the maintaining means ineffective and thereby to effect deenergization of the operated relay means corresponding to the floor at which the car is stopped.

44. In an elevator control system the combination with a car serving a number of floors, and car starting and stopping mechanism, of control devices and circuits therefor for causing the car to start in response to a call; to stop at floors in response to calls; and to restart after each stop until all calls are answered; said control devices and circuits including relay means for each floor; branched circuits for said relays; manually operable switches for causing energization of corresponding relay means, to store calls therein; a commutator machine having a unit controlling one branch of the circuit for each relay; maintaining means for relays; means for causing the maintaining means to automatically operate to close a second branch of the circuit for all of the relays, to maintain operated relays energized and hold calls stored therein, during movement of the car; means for causing said maintaining means to be rendered ineffective, opening the second branch of the circuit for the relays, when the car stops and the gate opens at a floor; and means governed by movement of the car for intermittently actuating the commutator to cause an opening in the first branch of the circuit for the relay means corresponding to a floor, said maintaining means and commutator unit thereby cooperating to cause deenergization of operated relay means corresponding to a floor at which the car stops, and to maintain calls stored in any other operated relay means for other floors.

45. In an elevator control system the combination with a car serving a number of floors, an automatically actuated gate for the car, and car starting and stopping mechanism; of control devices and circuits for causing the car to start in response to a call; to stop at floors in response to calls; and to restart after each stop until all calls are answered; said control devices and circuits including relay means for the floors; manually operable switches for causing energization of corresponding relay means to store calls therein; means responsive to the energized relay means for causing the gate to be automatically closed; means responsive to closing of the car gate for causing the operation of means to start and for causing the operation of maintaining means to maintain operated relays energized and calls stored therein, during movement of the car; means for causing the resetting of control mechanism to stop the car; means responsive to the reset control mechanism for causing the gate to be automatically opened; and means responsive to automatic opening of the gate for rendering said maintaining means ineffective and cause deenergization of the operated relay means for the corresponding floor.

46. In an elevator control system the combination with a car serving a number of floors, an automatically actuated gate for the car, and car starting and stopping mechanism; of control devices and circuits including relay means for each floor; switches for causing energization of corresponding relay means to store calls therein; means responsive to energized relay means for causing the operation of control mechanism to start the car; means responsive to energized relay means for causing control mechanism to be reset to stop the car; means responsive to the reset control mechanism for causing the gate to automatically open; and a time-delay mechanism comprising means directly controlled by the means governing the opening of the gate said means being operable at the end of the opening movement of the gate to initiate the operation of time-delay mechanism, said time-delay mechanism being operable at the end of its time period to cause the gate to automatically close to cause the car to restart after each stop, until all calls are answered.

47. In an elevator control system the combination with a car serving a number of floors, an automatically actuated gate for the car, and car starting and stopping mechanism; of control devices and circuits therefor including relay means for the floors; switches for causing energization of corresponding floor relay means to store calls therein; means responsive to energized relay means for causing the gate to automatically close; means responsive to closing of the gate for causing the car to start; means responsive to energized relay means for causing control mechanism to be reset to stop the car; means responsive to the reset control mechanism for causing the gate to automatically open; and a time-delay mechanism comprising means directly connected to the means for causing the gate to open, said last named means being operable at the end of the opening movement of the gate to initiate the operation of time mechanism, said time mechanism being operable at the end of the time period to cause the gate to automatically close after each stop, until all calls are answered, and thereby establish a predetermined time interval between the completion of the opening movement and the starting of the closing movement of the gate.

48. In an elevator control system the combination with a car for serving a number of floors, a gate for the car, and car starting and stopping mechanism; of control devices and circuits including an up and a down floor relay means for each of a plurality of floors; an up switch and a down push button at each of said plurality of floors operable to cause energization of a corresponding relay for the floor, and push buttons in the car one for each floor, each operable to cause energization of the up and the down relay for the corresponding floor; an up and a down direction relay; an up and a down direction switch; means responsive to an energized floor relay for causing energization of one of said direction relays; means responsive to the operated direction relay for causing the gate to be automatically closed; means responsive to closing of the gate for causing the operation of other of said control devices, including the direction switch corresponding to the direction relay actuated, to cause the car to start; means responsive to the energized floor relays for causing the control mechanism to be reset to stop the car; and means responsive to the resetting of control mechanism for causing the gate to be automatically opened at each floor at which the car is stopped.

49. In an elevator control system the combination with a car serving a number of floors, and car starting and stopping mechanism, of control devices and circuits including an up relay and a down relay at each of several floors, an up switch and a down switch at each of said several floors, the switches at all of the floors except the floor at which the car is located being operable to cause energization of a corresponding floor relay to store a call therein; switches in the car, one for each floor, operable to cause energization of corresponding up and down floor relays to store calls therein; means responsive to the actuation of a switch and the energization of a corresponding floor relay for causing the operation of control devices, including direction control means; means responsive to the energized floor relays for causing the resetting of control mechanism, other than the actuated direction control means, to cause the car to stop at intermediate floors only on calls in car-corresponding direction; and means for causing the resetting of actuated control mechanism, including the direction control means to cause the car to stop at the farthest floor in car-corresponding direction, and means operable upon stopping of the car to open circuit and cause deenergization of the floor relay or floor relays corresponding to each of said plurality of floors at which the car stops.

50. In an elevator control system the combination with a car serving a number of floors, and car starting and stopping mechanism; of control devices and circuits including relay means for each floor, manually operable switches for causing energization of corresponding relay means, to store calls therein; a commutator machine; means responsive to energized relay means for causing the operation of control devices and circuits, including a direction switch, to cause the car to start in the corresponding direction; means governed by movement of the car for intermittently causing step movement of the commutator; means controlled by the intermittent operation of the commutator, as the car approaches each intermediate floor for which a call is stored in relay means corresponding to direction of travel of the car, causes a circuit to be opened to reset said direction switch to stop the car at each of said floors; and means controlled by the intermittent operation of the commutator, as the car approaches the farthest floor for which a call is stored, causes a different opening in the circuit for the direction switch, to cause the car to be stopped at said farthest floor.

51. In an elevator control system the combination with a car serving a number of floors, an automatically actuated gate for the car, and car starting and stopping mechanism, of control devices and circuits, including relay means for each floor, manually operable switches for causing energization of corresponding relay means to store calls therein; an intermittently operable, remotely located commutator machine, governed by movement of the car; means responsive to energized relay means for causing the operation of control devices, including means for causing the gate to automatically close, and a direction switch, to cause the car to start in the corresponding direction; means controlled by an intermittent operation of the commutator machine, as the car approaches each floor for which a call is stored in car-corresponding direction, causes a circuit to be opened to reset the direction switch to stop the car at each of said floors; means controlled by the intermittent operation of the commutator as the car approaches the farthest floor for which a call is stored, causes a different opening in the circuit for the direction switch to cause the car to stop at said farthest floor; means responsive to the resetting of control mechanism to stop the car, for causing the gate to be automatically opened; and a time-delay element controlled by the means for causing the gate to open, for causing the gate to be automatically closed, until all calls are answered.

52. In an elevator control system the combination with a car serving a number of floors, and car starting and stopping mechanism, of control devices and circuits including relay means for the floors, manually operable switches for causing energization of corresponding relay means, to store calls therein; an intermittently operable commutator machine, governed by movement of the car; means controlled by an intermittent operation of the commutator, as the car approaches each floor for which a call is stored in car-corresponding direction, for causing the commutator to cause a control circuit to be prepared to be opened; and means responsive to the succeeding intermittent operation of the commutator for causing the said prepared control circuit to be opened to stop the car at each of said floors.

53. In an elevator control system the combination with a car serving a number of floors, and car starting and stopping mechanism, of control devices and circuits including relay means for the floors, manually operable switches for causing energization of corresponding relay means, to store calls therein, an intermittently operable commutator machine, governed by movement of the car, and comprising a dispatch unit and a stopping unit; means responsive to energized relay means for causing the operation of control devices, including direction control means controlled by said dispatch unit of the commutator, to cause the car to start; means controlled by intermittent operation of the commutator, as the car approaches each floor for which a call is stored in car-corresponding direction, for causing the stopping unit to prepare a control circuit to be opened; means responsive to the succeeding intermittent operation of the commutator for causing said prepared control circuit to be opened, to cause the car to stop at each of said floors; and means controlled by the intermittent operation of the commutator, as the car approaches the farthest floor for which a call is stored, causes the dispatch unit of the commutator to open a circuit for the actuated direction control means to cause the car to stop at said farthest floor.

54. In an elevator control system the combination with a car serving a number of floors, car starting and stopping mechanism, a gate for the car, operating means for causing the gate to open, and operating means for causing the gate to close; of control devices and circuits operable for causing the car to start in response to a call; to stop at floors in response to calls and to restart after each stop until all calls are answered, and means directly controlled by and operable by the operating mechanism for closing the gate remaining operated beyond a predetermined time period for causing all operated control devices to be deenergized, thereby restoring the control system to its original condition.

55. In a control system for an elevator car serving several floors, the combination of a floor selector, including a rotatably mounted ratchet gear, two electro-magnets and mechanism controlled by said magnets for causing step movements of the gear in clockwise and counter-clockwise directions, and for locking the gear to terminate each of its step movements, means governed by movement of the elevator car for causing intermittent, selective, automatic operation of either of said magnets and its armature; the mechanism associated with each of the magnets comprising a weighted link mounted for swinging movement, cooperating means for limiting movement of the link and an operating and locking pawl for the gear, said pawl being fulcrumed on a link and pivotally connected with the armature of its associated magnet, each of said magnets being operable to first cause an associated pawl to rock on its connection with a weighted link, into sliding contact with a tooth surface of the gear; then to lift the weighted link causing the pawl to wedgingly engage between the said surface of the said tooth and a surface of an adjacent tooth of the gear; to advance the gear; and to arrest movement of the swinging link, which causes the pawl to be positively locked to the gear, thus terminating its step movement and causing the momentum developed in the gear, to be absorbed by said mechanism to prevent overrun and backlash, and means automatically operable, only after each complete step movement of the gear, for causing an operated pawl to be unlocked and to be restored to its original position with respect to the gear, whereby each operation of one of said magnets causes a controlled step movement of the gear through a uniformly exact distance.

56. In a control system for an elevator car serving several floors, the combination of: a floor selector, including a rotatably mounted ratchet gear, two electro-magnets, mechanism, including a pawl controlled by each of said magnets for causing step movements of the gear in clockwise and counter-clockwise directions, means governed by movement of the elevator car for causing automatic intermittent and selective operation of either of said magnets, to first cause an associated pawl to rock into sliding contact with a tooth surface of the said ratchet gear; then to cause the pawl to wedgingly engage between the said surface of the said tooth and the surface of an adjacent tooth of the gear to advance the gear, and to then cause the pawl to be locked to the ratchet gear, thus terminating its step movement and causing the momentum developed in the gear, to be absorbed by said mechanism to prevent overrun and back lash, and means automatically operable only after each complete step movement of said ratchet gear for causing an operated pawl to be unlocked and to be restored to its original position with respect to the said ratchet gear, whereby each operation of one of said magnets causes a controlled step movement of the gear through a uniformly exact distance.

57. In a control system for an elevator car serving several floors, the combination with car starting and stopping apparatus mechanically connected with the elevator car, of a controller comprising a number of electro-magnets for controlling operations of the car; a channel member supporting said electro-magnets along and within the channel of the member, and providing for each of the magnets a magnetic flex path at the portion at which each magnet is located in the channel of the member, the said channel being open at one side throughout its length to allow ready access to the magnets supported within flanges of the member, and free circulation of air throughout the member and about each of the magnets mounted in the member; and means electrically connecting the controller to the car starting and stopping apparatus, whereby a compact unit is provided for control of an elevator car, the unit being free of mechanical connection to the car starting and stopping apparatus, and being capable of ready replacement, and of being remotely located with respect to the car and the car starting and stopping apparatus.

58. In a control system for an elevator car serving several floors, the combination with starting and stopping apparatus connected with the elevator car, of: a controller, structural members arranged in said controller and a number of electro-magnets for controlling operations of the elevator car, at least one of said structural members being formed and arranged to provide support for a plurality of said electro-magnets, said electro-magnets being supported within and spaced along said structural member, and the said member being open at one side throughout its length to allow ready access to the magnets supported in the said member and free circulation of air throughout the said member and about each of the magnets supported in the said member, and means electrically connecting the controller to the car starting and stopping apparatus, whereby a compact unit is provided for control of an elevator car, the unit being free of mechanical connections to the car starting and stopping apparatus and being capable of ready replacement and of being remotely located with respect to the car and the car starting and stopping apparatus.

MARCELLUS STALEY.
ADOLF KRAMER.